(12) United States Patent
Senshu

(10) Patent No.: US 6,546,519 B2
(45) Date of Patent: *Apr. 8, 2003

(54) OPTICAL DISC RECORDING/ REPRODUCING METHOD, OPTICAL DISC AND OPTICAL DISC DEVICE

(75) Inventor: Susumu Senshu, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/930,529

(22) Filed: Aug. 15, 2001

(65) Prior Publication Data

US 2002/0013925 A1 Jan. 31, 2002

Related U.S. Application Data

(63) Continuation of application No. 09/371,115, filed on Aug. 10, 1999, now Pat. No. 6,349,400, which is a continuation of application No. PCT/JP98/05593, filed on Dec. 10, 1998.

(30) Foreign Application Priority Data

Dec. 12, 1997 (JP) .............................. 9-343442
Feb. 16, 1998 (JP) ........................... 10-050081

(51) Int. Cl.[7] .......................... G11C 29/00; G11B 7/00
(52) U.S. Cl. .................... 714/769; 714/768; 369/53.31; 369/53.32; 369/53.35
(58) Field of Search ............................... 714/764, 769, 714/768, 770, 771, 752, 758, 775, 805, 819; 369/32, 53, 54, 58, 59, 47, 47.11, 47.12, 53.31, 53.35, 53.44, 59.26, 124.07, 275.3; 386/47, 91, 98, 111

(56) References Cited

U.S. PATENT DOCUMENTS 5,623,459 A 4/1997 Iwamura et al. ............... 369/32
5,889,745 A 3/1999 Aramaki ...................... 369/58
5,896,355 A 4/1999 Sako et al. ................... 369/58

FOREIGN PATENT DOCUMENTS

| JP | 58-175113 | 10/1983 |
| JP | 59-195309 | 11/1984 |
| JP | 63-157372 | 6/1988 |
| JP | 63-157373 | 6/1988 |
| JP | 1-106369 | 4/1989 |

OTHER PUBLICATIONS

Patent Abstracts of Japan vol. 017, No. 519 (P–1615), Sep. 17, 1993 & JP 05 135503 A (Sony Corp), Jun. 1, 1993.
Schouhamer Immink K A: "The Digital Versatile Disc (DVD): System Requirements and Channel Coding" SMPTE Journal, SMPTE Inc. Scarsdale, N.Y., US, vol. 105, No. 8, Aug. 1, 1996, pp. 483–489, XP000627183 ISSN: 0036–1682.
Patent Abstracts of Japan vol. 013, No. 226 (E–763), May 25, 1989 & JP 01 034076 A (Sony Corp), Feb. 3, 1989).

Primary Examiner—Emmanuel L. Moise
(74) Attorney, Agent, or Firm—Frommer Lawrence & Haug LLP; William S. Frommer; Dennis M. Smid

(57) ABSTRACT

Data recording/reproduction is carried out in a disc format such that error correction codes interleaved with respect to the direction of data on a disc are collectively blocked into an error correction unit and that the input/output order of user data in an ECC block as an error correction unit is made coincident with the direction of processing of the error correction codes. Thus, coding can be started at the time when necessary data for generating one code is transmitted, without waiting for transmission of data for one ECC block. Also, transmission of user data can be started at the time when correction of one code is completed, without waiting for completion of correction operation for one ECC block. Also, since the direction of correction codes is the same as the direction of user data, no memory for rearrangement of data is required and the hardware structure can be minimized. Moreover, since less data transmission/reception takes place between the buffer memory and the external device, bus arbitration can be easily carried out.

15 Claims, 34 Drawing Sheets

| 96(lines) | 384(lines) 96(lines) | 96(lines) | 96(lines) |
|---|---|---|---|
| header frame0 | 49 | 98 | 147 |
| 196 | 245 | 294 | 343 |
| 392 | 441 | 490 | 539 |
| 588 | 637 | 686 | 735 |
| 736 | 1 | 50 | 99 |
| 148 | 197 | 246 | 295 |
| 344 | 393 | 442 | 491 |
| 540 | 589 | 638 | 687 |
| 688 | 737 | 2 | 51 |
| 100 | 149 | 198 | 247 |
| 296 | 345 | 394 | 443 |
| 492 | 541 | 590 | 639 |
| 640 | 689 | 738 | 3 |
| 52 | 101 | 150 | 199 |
| 248 | 297 | 346 | 395 |
| 444 | 493 | 542 | 591 |
| 592 | 641 | 690 | 739 |
| 4 | 53 | 102 | 151 |
| 200 | 249 | 298 | 347 |
| 396 | 445 | 494 | 543 |
| 544 | 593 | 642 | 691 |
| 740 | 5 | 54 | 103 |
| 152 | 201 | 250 | 299 |
| 348 | 397 | 446 | 495 |
| 496 | 545 | 594 | 643 |
| 692 | 741 | 6 | 55 |
| 104 | 153 | 202 | 251 |
| 300 | 349 | 398 | 447 |
| 448 | 497 | 546 | 595 |
| 644 | 693 | 742 | 7 |
| 56 | 105 | 154 | 203 |
| 252 | 301 | 350 | 399 |
| 336 | 385 | 434 | 483 |
| 532 | 581 | 630 | 679 |
| 728 | 777 | 42 | 91 |
| 140 | 189 | 238 | 287 |
| 288 | 337 | 386 | 435 |
| 484 | 533 | 582 | 631 |
| 680 | 729 | 778 | 43 |
| 92 | 141 | 190 | 239 |
| 240 | 289 | 338 | 387 |
| 436 | 485 | 534 | 583 |
| 632 | 681 | 730 | 779 |
| 44 | 93 | 142 | 191 |
| 48 | 97 | 146 | 195 |
| 244 | 293 | 342 | 391 |
| 440 | 489 | 538 | 587 |
| 636 | 685 | 734 | 783 |

FIG.3

|  | 100 bytes | | | | |
|---|---|---|---|---|---|
| segment 0<br>20 bytes | segment 1 | | segment 4 | sector | frame |
| B(0,0,0,0)   B(0,0,0,19) | B(0,0,1,0) | | B(0,0,4,0)   B(0,0,4,19) | 0 | 0 |
| B(0,1,0,0)   B(0,1,0,19) | B(0,1,1,0) | | B(0,1,4,0)   B(0,1,4,19) | 0 | 1 |
|  |  | | |  | 2 |
|  |  | | |  | 3 |
|  |  | | |  | 4 |
|  |  | | |  | 5 |
|  |  | | |  | 44 |
|  |  | | |  | 15 | 45 |
| B(15,46,0,0)  B(15,46,0,19) | B(15,46,1,0) | | B(15,46,4,0)   B(15,46,4,19) | 15 | 46 |

B(s,t,u,v)   s : sector
t : frame
u : segment
v : byte

FIG.7A

|  | 1200 channels (+DCCC) | | | | |
|---|---|---|---|---|---|
| segment 0<br>240 channels (+DCCC) | segment 1 | | segment 4 | sector | frame |
| m(0,0,0,0)   m(0,0,0,239) | m(0,0,1,0) | | m(0,0,4,0)   m(0,0,4,239) | 0 | 0 |
| m(0,1,0,0)   m(0,1,0,239) | m(0,1,1,0) | | m(0,1,4,0)   m(0,1,4,239) | 0 | 1 |
|  |  | | |  | 2 |
|  |  | | |  | 3 |
|  |  | | |  | 4 |
|  |  | | |  | 5 |
|  |  | | |  | 44 |
|  |  | | |  | 15 | 45 |
| m(15,46,0,0)  m(15,46,0,239) | m(15,46,1,0) | | m(15,46,4,0)  m(15,46,4,239) | 15 | 46 | m(s,t,u,v)   s : sector
t : frame
u : segment
w : channel

FIG.7B

| APC | VFO | ←FS← | FRAME (channel) | →PO | sector | frame |
|---|---|---|---|---|---|---|
| APC | VFO | FS1 | m(0,0,0,0) | m(0,0,4,239) | | 0 | 0 |
| | | FS0 | m(0,0,0,0) | m(0,1,4,239) | | | 1 |
| | | | | | | | 2 |
| | | FS0 | | | | | 39 |
| | | FS0 | | | | | 40 |
| | | FS0 | | | | | 41 |
| | | FS0 | | | | | 42 |
| | | FS0 | | | | | 43 |
| | | FS0 | | | | | 44 |
| | | FS0 | m(0,45,0,0) | m(0,45,4,239) | | | 45 |
| | | FS0 | m(0,46,0,0) | m(0,46,4,239) | PO | | 46 |
| APC | VFO | FS1 | m(1,0,0,0) | m(1,0,4,239) | | 1 | 0 |
| | | FS0 | m(1,1,0,0) | m(1,1,4,239) | | | 1 |
| | | | | | | | 2 |
| | | FS0 | | | | | 39 |
| | | FS0 | | | | | 40 |
| | | FS0 | | | | | 41 |
| | | FS0 | | | | | 42 |
| | | FS0 | | | | | 43 |
| | | FS0 | | | | | 44 |
| | | FS0 | m(1,45,0,0) | m(1,45,4,239) | | | 45 |
| | | FS0 | m(1,46,0,0) | m(1,46,4,239) | PO | | 46 |
| APC | VFO | FS1 | m(2,0,0,0) | m(2,0,4,239) | | 2 | 0 |
| | | FS0 | m(2,1,0,0) | m(2,1,4,239) | | | 1 |
| | | | | | | | 2 |
| | | FS0 | | | | | 39 |
| | | FS0 | | | | | 40 |
| | | FS0 | | | | | 41 |
| | | FS0 | | | | | 42 |
| | | FS0 | | | | | 43 |
| | | FS0 | | | | | 44 |
| | | FS0 | m(14,45,0,0) | m(14,45,4,239) | | | 45 |
| | | FS0 | m(14,46,0,0) | m(14,46,4,239) | PO | | 46 |
| APC | VFO | FS1 | m(15,0,0,0) | m(15,0,4,239) | | 15 | 0 |
| | | FS0 | m(15,1,0,0) | m(15,1,4,239) | | | 1 |
| | | FS0 | | | | | 39 |
| | | FS0 | | | | | 40 |
| | | FS0 | | | | | 41 |
| | | FS0 | | | | | 42 |
| | | FS0 | | | | | 43 |
| | | FS0 | | | | | 44 |
| | | FS0 | m(15,45,0,0) | m(15,45,4,239) | | | 45 |
| | | FS0 | m(15,46,0,0) | m(15,46,4,239) | PO | | 46 |

FIG.8

| APC | VFO | ←FS← | FRAME (channel) | →PO | sector | frame |
|---|---|---|---|---|---|---|
| APC | VFO | FS1 | m(0,0,0,0) | m(0,0,4,239) | 0 | 0 |
|  |  | FS0 | m(0,0,0,0) | m(0,1,4,239) |  | 1 |
|  |  |  |  |  |  | 2 |
|  |  | FS0 |  |  |  | 39 |
|  |  | FS0 |  |  |  | 40 |
|  |  | FS0 |  |  |  | 41 |
|  |  | FS0 |  |  |  | 42 |
|  |  | FS0 |  |  |  | 43 |
|  |  | FS0 |  |  |  | 44 |
|  |  | FS0 | m(0,45,0,0) | m(0,45,4,239) |  | 45 |
|  |  | FS0 | m(0,46,0,0) | m(0,46,4,239) PO |  | 46 |
| APC | VFO | FS1 | m(1,0,0,0) | m(1,0,4,239) | 1 | 0 |
|  |  | FS0 | m(1,1,0,0) | m(1,1,4,239) |  | 1 |
|  |  |  |  |  |  | 2 |
|  |  | FS0 |  |  |  | 39 |
|  |  | FS0 |  |  |  | 40 |
|  |  | FS0 |  |  |  | 41 |
|  |  | FS0 |  |  |  | 42 |
|  |  | FS0 |  |  |  | 43 |
|  |  | FS0 |  |  |  | 44 |
|  |  | FS0 | m(1,45,0,0) | m(1,45,4,239) |  | 45 |
|  |  | FS0 | m(1,46,0,0) | m(1,46,4,239) PO |  | 46 |
| APC | VFO | FS1 | m(2,0,0,0) | m(2,0,4,239) | 2 | 0 |
|  |  | FS0 | m(2,1,0,0) | m(2,1,4,239) |  | 1 |
|  |  |  |  |  |  | 2 |
|  |  | FS0 |  |  |  | 39 |
|  |  | FS0 |  |  |  | 40 |
|  |  | FS0 |  |  |  | 41 |
|  |  | FS0 |  |  |  | 42 |
|  |  | FS0 |  |  |  | 43 |
|  |  | FS0 |  |  |  | 44 |
|  |  | FS0 | m(14,45,0,0) | m(14,45,4,239) |  | 45 |
|  |  | FS0 | m(14,46,0,0) | m(14,46,4,239) PO |  | 46 |
| APC | VFO | FS1 | m(15,0,0,0) | m(15,0,4,239) | 15 | 0 |
|  |  | FS0 | m(15,1,0,0) | m(15,1,4,239) |  | 1 |
|  |  |  |  |  |  | 2 |
|  |  | FS0 |  |  |  | 39 |
|  |  | FS0 |  |  |  | 40 |
|  |  | FS0 |  |  |  | 41 |
|  |  | FS0 |  |  |  | 42 |
|  |  | FS0 |  |  |  | 43 |
|  |  | FS0 |  |  |  | 44 |
|  |  | FS0 | m(15,45,0,0) | m(15,45,4,239) |  | 45 |
|  |  | FS0 | m(15,46,0,0) | m(15,464,239) PO |  | 46 |

FIG.9

| | 20(lines) | | | | | | | 320(lines) | | |
|---|---|---|---|---|---|---|---|---|---|---|
| | B(0,0,0,0-19) | B(3,0,0,-) | B(6,0,0,-) | B(9,0,0,-) | B(12,0,0,-) | B(15,0,0,-) | B(2,0,0,-) | B(5,0,0,-) | Bb(10,0,0,-) | B(13,0,0,-) |
| | B(13,0,1,-) | B(0,0,1,-) | B(3,0,1,-) | B(6,0,1,-) | B(9,0,1,-) | B(12,0,1,-) | B(15,0,1,-) | B(2,0,1,-) | B(7,0,1,-) | B(10,0,1,-) |
| | B(10,0,2,-) | B(13,0,2,-) | B(0,0,2,-) | B(3,0,2,-) | B(6,0,2,-) | B(9,0,2,-) | B(12,0,2,-) | B(15,0,2,-) | | B(7,0,2,-) |
| | | | | B(0,0,3,-) | B(3,0,3,-) | B(6,0,3,-) | B(9,0,3,-) | B(12,0,3,-) | | |
| | | | | | B(0,0,4,-) | B(3,0,4,-) | B(6,0,4,-) | B(9,0,4,-) | | |
| | | | | | | B(0,1,0,-) | B(3,1,0,-) | B(6,1,0,-) | | |
| | | | | | | | B(0,1,1,-) | B(3,1,1,-) | | |
| | | | | | | | | B(0,1,2,-) | | |

206 words
(information words)

29 words
(parity words)

| B(8,46,2,-) | | | | | | | | | | B(5,46,2,-) |
| B(5,46,3,-) | B(8,46,3,-) | | | | | | | | B(15,46,3,-) | B(2,46,3,-) |
| B(2,46,4,-) | B(5,46,4,-) | B(8,46,4,-) | | | | | | | B(12,46,4,-) | B(15,46,4,-) |

FIG.10

| Header<br>20 | | User Data<br>4096 | | EDC<br>4 | data unit |
|---|---|---|---|---|---|
| H(0,0) H(0,19) | + | U(0,0) U(0,4095) | + | E(0,0) E(0,3) | 0 |
| H(1,0) H(1,19) | + | U(1,0) U(1,4095) | + | E(1,0) E(1,3) | 1 |
| H(15,0) H(15,19) | + | U(15,0) U(15,4095) | + | E(15,0) E(15,3) | 15 |

FIG.12

|  | 20 (lines) | |
|---|---|---|
| B(x,0,0,0) | - | B(x,0,0,19) |
| B(x,0,1,0) | - | B(x,0,1,19) |
| B(x,0,2,0) | - | B(x,0,2,19) |
| B(x,0,3,0) | - | B(x,0,3,19) |
| B(x,0,4,0) | - | B(x,0,4,19) |
| B(x,1,0,0) | - | B(x,1,0,19) |
| B(x,1,1,0) | - | B(x,1,1,19) |
| B(x,1,2,0) | - | B(x,1,2,19) |

206 words (information words)

29 words (parity words)

| B(x,46,2,0) | - | B(x,46,2,19) |
| B(x,46,3,0) | - | B(x,46,3,19) |
| B(x,46,4,0) | - | B(x,46,4,19) |

FIG.13

|  | 50 bytes | | | | | sector | frame |
|---|---|---|---|---|---|---|---|
| segment 0<br>10 bytes | | segment 1 | | segment 4 | | | |
| B(0,0,0,0) | B(0,0,0,9) | B(0,0,1,0) | | B(0,0,4,0) | B(0,0,4,9) | 0 | 0 |
| B(0,1,0,0) | B(0,1,0,9) | B(0,1,1,0) | | B(0,1,4,0) | B(0,1,4,9) | 0 | 1 |
| | | | | | | | 2 |
| | | | | | | | 3 |
| | | | | | | | 4 |
| | | | | | | | 5 |
| | | | | | | | 44 |
| | | | | | | 31 | 45 |
| B(31,46,0,0) | B(31,46,0,9) | B(31,46,1,0) | | B(31,46,4,0) | B(31,46,4,9) | 31 | 46 |

B(s,t,u,v)   s : sector
             t : frame
             u : segment
             v : byte

FIG.14A

|  | 600 channels (+DCCC) | | | | | sector | frame |
|---|---|---|---|---|---|---|---|
| segment 0<br>120 channels (+DCCC) | | segment 1 | | segment 4 | | | |
| m(0,0,0,0) | m(0,0,0,119) | m(0,0,1,0) | | | m(0,0,4,119) | 0 | 0 |
| m(0,1,0,0) | m(0,1,0,119) | m(0,1,1,0) | | m(0,1,4,0) | m(0,1,4,119) | 0 | 1 |
| | | | | | | | 2 |
| | | | | | | | 3 |
| | | | | | | | 4 |
| | | | | | | | 5 |
| | | | | | | | 44 |
| | | | | | | 31 | 45 |
| m(31,46,0,0) | m(31,46,0,119) | m(31,46,1,0) | | m(31,46,4,0) | m(31,46,4,119) | 31 | 46 | m(s,t,u,v)   s : sector
             t : frame
             u : segment
             w : channel

FIG.14B

| APC | VFO | ←FS← | FRAME (channel) | →PO | sector | frame |
|---|---|---|---|---|---|---|
| APC | VFO | FS1 | m(0,0,0,0) | m(0,0,4,119) | | 0 | 0 |
| | | FS0 | m(0,0,0,0) | m(0,1,4,119) | | | 1 |
| | | | | | | | 2 |
| | | FS0 | | | | | 39 |
| | | FS0 | | | | | 40 |
| | | FS0 | | | | | 41 |
| | | FS0 | | | | | 42 |
| | | FS0 | | | | | 43 |
| | | FS0 | | | | | 44 |
| | | FS0 | m(0,45,0,0) | m(0,45,4,119) | | | 45 |
| | | FS0 | m(0,46,0,0) | m(0,46,4,119) | PO | | 46 |
| APC | VFO | FS1 | m(1,0,0,0) | m(1,0,4,119) | | 1 | 0 |
| | | FS0 | m(1,1,0,0) | m(1,1,4,119) | | | 1 |
| | | | | | | | 2 |
| | | FS0 | | | | | 39 |
| | | FS0 | | | | | 40 |
| | | FS0 | | | | | 41 |
| | | FS0 | | | | | 42 |
| | | FS0 | | | | | 43 |
| | | FS0 | | | | | 44 |
| | | FS0 | m(1,45,0,0) | m(1,45,4,119) | | | 45 |
| | | FS0 | m(1,46,0,0) | m(1,46,4,119) | PO | | 46 |
| APC | VFO | FS1 | m(2,0,0,0) | m(2,0,4,119) | | 2 | 0 |
| | | FS0 | m(2,1,0,0) | m(2,1,4,119) | | | 1 |
| | | | | | | | 2 |
| | | FS0 | | | | | 39 |
| | | FS0 | | | | | 40 |
| | | FS0 | | | | | 41 |
| | | FS0 | | | | | 42 |
| | | FS0 | | | | | 43 |
| | | FS0 | | | | | 44 |
| | | FS0 | m(30,45,0,0) | m(30,45,4,119) | | | 45 |
| | | FS0 | m(30,46,0,0) | m(30,46,4,119) | PO | | 46 |
| APC | VFO | FS1 | m(31,0,0,0) | m(31,0,4,119) | | 31 | 0 |
| | | FS0 | m(31,1,0,0) | m(31,1,4,119) | | | 1 |
| | | FS0 | | | | | 39 |
| | | FS0 | | | | | 40 |
| | | FS0 | | | | | 41 |
| | | FS0 | | | | | 42 |
| | | FS0 | | | | | 43 |
| | | FS0 | | | | | 44 |
| | | FS0 | m(31,45,0,0) | m(31,45,4,119) | | | 45 |
| | | FS0 | m(31,46,0,0) | m(31,46,4,119) | PO | | 46 |

```
                    79 bytes
   ┌─────────────────────────────────────────────────────────┐
                                                              sector  frame
   B(0,0,0,0)                                     B(0,0,78,0)   0      0
   B(0,1,0,0)                                     B(0,1,78,0)   0      1
                                                                       2
                                                                       3
                                                                       4
                                                                       5

57
                                                               15     58
   B(15,59,0,0)                                  B(15,59,78,0) 15     59
```

B(s,t,u,v)   s : sector
             t : frame
             u : segment
             v : byte

FIG.26A

```
                948 channels (+DCCC)
   ┌─────────────────────────────────────────────────────────┐
                                                              sector  frame
   m(0,0,0,0)                                    m(0,0,78,11)   0      0
   m(0,1,0,0)                                    m(0,1,78,11)   0      1
                                                                       2
                                                                       3
                                                                       4
                                                                       5

57
                                                               15     58
   m(15,59,0,0)                                 m(15,59,78,11) 15     59
``` m(s,t,u,v)   s : sector
             t : frame
             u : segment
             w : channel

FIG.26B

| APC | VFO | ←FS← | FRAME (channel) | →PO | sector | frame |
|---|---|---|---|---|---|---|
| APC | VFO | FS1 | m(0,0,0,0) | m(0,0,78,11) | 0 | 0 |
|  |  | FS0 | m(0,1,0,0) | m(0,1,78,11) |  | 1 |
|  |  |  |  |  |  | 2 |
|  |  | FS0 |  |  |  | 52 |
|  |  | FS0 |  |  |  | 53 |
|  |  | FS0 |  |  |  | 54 |
|  |  | FS0 |  |  |  | 55 |
|  |  | FS0 |  |  |  | 56 |
|  |  | FS0 |  |  |  | 57 |
|  |  | FS0 | m(0,58,0,0) | m(0,58,78,11) |  | 58 |
|  |  | FS0 | m(0,59,0,0) | m(0,59,78,11) PO |  | 59 |
| APC | VFO | FS1 | m(1,0,0,0) | m(1,0,78,11) | 1 | 0 |
|  |  | FS0 | m(1,1,0,0) | m(1,1,78,11) |  | 1 |
|  |  |  |  |  |  | 2 |
|  |  | FS0 |  |  |  | 52 |
|  |  | FS0 |  |  |  | 53 |
|  |  | FS0 |  |  |  | 54 |
|  |  | FS0 |  |  |  | 55 |
|  |  | FS0 |  |  |  | 56 |
|  |  | FS0 |  |  |  | 57 |
|  |  | FS0 | m(1,58,0,0) | m(1,58,78,11) |  | 58 |
|  |  | FS0 | m(1,59,0,0) | m(1,59,78,11) PO |  | 59 |
| APC | VFO | FS1 | m(2,0,0,0) | m(2,0,78,11) | 2 | 0 |
|  |  | FS0 | m(2,1,0,0) | m(2,1,78,11) |  | 1 |
|  |  |  |  |  |  | 2 |
|  |  | FS0 |  |  |  | 52 |
|  |  | FS0 |  |  |  | 53 |
|  |  | FS0 |  |  |  | 54 |
|  |  | FS0 |  |  |  | 55 |
|  |  | FS0 |  |  |  | 56 |
|  |  | FS0 |  |  |  | 57 |
|  |  | FS0 | m(14,58,0,0) | m(14,58,78,11) |  | 58 |
|  |  | FS0 | m(14,59,0,0) | m(14,59,78,11) PO |  | 59 |
| APC | VFO | FS1 | m(15,0,0,0) | m(15,0,78,11) | 15 | 0 |
|  |  | FS0 | m(15,1,0,0) | m(15,1,78,11) |  | 1 |
|  |  |  |  |  |  | 2 |
|  |  | FS0 |  |  |  | 52 |
|  |  | FS0 |  |  |  | 53 |
|  |  | FS0 |  |  |  | 54 |
|  |  | FS0 |  |  |  | 55 |
|  |  | FS0 |  |  |  | 56 |
|  |  | FS0 |  |  |  | 57 |
|  |  | FS0 | m(15,58,0,0) | m(15,58,78,11) |  | 58 |
|  |  | FS0 | m(15,59,0,0) | m(15,59,78,11) PO |  | 59 |

FIG.27

| APC | VFO | ←FS← | FRAME (channel) | →PO | sector | frame |
|---|---|---|---|---|---|---|
| APC | VFO | FS1 | m(0,0,0,0) | m(0,0,118,11) | 0 | 0 |
|  |  | FS0 | m(0,1,0,0) | m(0,1,118,11) |  | 1 |
|  |  |  |  |  |  | 2 |
|  |  | FS0 |  |  |  | 32 |
|  |  | FS0 |  |  |  | 33 |
|  |  | FS0 |  |  |  | 34 |
|  |  | FS0 |  |  |  | 35 |
|  |  | FS0 |  |  |  | 36 |
|  |  | FS0 |  |  |  | 37 |
|  |  | FS0 | m(0,38,0,0) | m(0,38,118,11) |  | 38 |
|  |  | FS0 | m(0,39,0,0) | m(0,39,118,11) PO |  | 39 |
| APC | VFO | FS1 | m(1,0,0,0) | m(1,0,118,11) | 1 | 0 |
|  |  | FS0 | m(1,1,0,0) | m(1,1,118,11) |  | 1 |
|  |  |  |  |  |  | 2 |
|  |  | FS0 |  |  |  | 32 |
|  |  | FS0 |  |  |  | 33 |
|  |  | FS0 |  |  |  | 34 |
|  |  | FS0 |  |  |  | 35 |
|  |  | FS0 |  |  |  | 36 |
|  |  | FS0 |  |  |  | 37 |
|  |  | FS0 | m(1,38,0,0) | m(1,38,118,11) |  | 38 |
|  |  | FS0 | m(1,39,0,0) | m(1,39,118,11) PO |  | 39 |
| APC | VFO | FS1 | m(2,0,0,0) | m(2,0,118,11) | 2 | 0 |
|  |  | FS0 | m(2,1,0,0) | m(2,1,118,11) |  | 1 |
|  |  |  |  |  |  | 2 |
|  |  | FS0 |  |  |  | 32 |
|  |  | FS0 |  |  |  | 33 |
|  |  | FS0 |  |  |  | 34 |
|  |  | FS0 |  |  |  | 35 |
|  |  | FS0 |  |  |  | 36 |
|  |  | FS0 |  |  |  | 37 |
|  |  | FS0 | m(14,38,0,0) | m(14,38,118,11) |  | 38 |
|  |  | FS0 | m(14,39,0,0) | m(14,39,118,11) PO |  | 39 |
| APC | VFO | FS1 | m(15,0,0,0) | m(15,0,118,11) | 15 | 0 |
|  |  | FS0 | m(15,1,0,0) | m(15,1,118,11) |  | 1 |
|  |  |  |  |  |  | 2 |
|  |  | FS0 |  |  |  | 32 |
|  |  | FS0 |  |  |  | 33 |
|  |  | FS0 |  |  |  | 34 |
|  |  | FS0 |  |  |  | 35 |
|  |  | FS0 |  |  |  | 36 |
|  |  | FS0 |  |  |  | 37 |
|  |  | FS0 | m(15,38,0,0) | m(15,38,118,11) |  | 38 |
|  |  | FS0 | m(15,39,0,0) | m(15,39,118,11) PO |  | 39 |

FIG.32

OPTICAL DISC RECORDING/ REPRODUCING METHOD, OPTICAL DISC AND OPTICAL DISC DEVICE

This is a Continuation of application Ser. No. 09/371,115 filed Aug. 10, 1999, now U.S. Pat. No. 6,349,400 B1, which is a Continuation of International Application PCT/JP98/ 05593 having an international filing date of Dec. 10, 1998.

TECHNICAL FIELD

This invention related to an optical disc recording/ reproducing method, an optical disc and an optical disc device.

BACKGROUND ART

Conventionally, optical recording media such as a disc-shaped optical recording medium and a card-shaped optical recording medium using an optical or magneto-optical signal recording/reproducing method have been developed and provided on the market. As such optical recording media, there have been known read-only memory type recording media such as a so-called compact disc (CD), so-called write-once type recording media which enable data writing once on the user side, and rewritable recording media which enable so-called overwrite such as a magneto-optical (MO) disc.

In an optical disc device for carrying out writing/reading of data onto/from a disc-shaped recording medium, a laser diode for emitting a light beam for information recording/ reproduction and a photodetector for detecting a reflected light of a light beam radiated onto an optical disc are provided. Using an optical head on which focusing servo and tracking servo are performed on the basis of the detection output from the photodetector, speed servo is performed on a spindle motor and the optical disc is rotated at a constant angular velocity or a constant linear velocity while a recording track of the optical disc is scanned with a light beam, thereby carrying out data recording/reproduction.

In a magneto-optical disc system prescribed by the International Organization for Standardization (ISO), blocked codes are employed.

In the format of magneto-optical disc prescribed by the ISO, the direction of user data is equal to the direction of data on the disc as shown in FIG. 1. In an ECC block using blocked codes, the direction of correction codes is interleaved with respect to the direction of data on the disc in order to improve the capability of correcting burst errors. Also, in this format, data immediately after frame synchronization FS belong to separate identical correction codes, and the second data from frame synchronization FS belong to separate identical error correction codes. Similarly, data immediately before frame synchronization FS belong to separate identical error correction codes.

At the time of recording on the optical disc of such a format, when all the user data sent from the application side for one ECC block is written into a buffer memory 302 through an arbiter 301, as shown in FIG. 2A, an ECC processing section 303 starts error correction coding. After coding of all the data in one ECC block is completed, the coded data is sent from the buffer memory 302 to modulation means and channel encoding is started. Thus, channel-encoded data is recorded in the user data area on the disc.

At the time of reproduction, reproduction data obtained from the disc is channel-decoded by demodulation means. When all the data for one ECC block is written into the buffer memory 302 through the arbiter 301, as shown in FIG.2B, the ECC processing section 303 starts decoding. After decoding of all the data in one ECC block is completed, the user data is taken out from the buffer memory 302 and is sent to the application side.

As described above, in the magneto-optical disc system prescribed by the ISO, the direction of user data is equal to the direction of data on the disc, and the direction of error correction codes is interleaved with respect to the direction of data on the disc. Therefore, at the time of recording, error correction coding cannot be started unless all the user data for one block is written into the buffer memory. Unless coding of all the data in the block is completed, channel encoding of coded data cannot be started and hence channel-encoded data cannot be recorded onto the disc. At the time of reproduction, decoding cannot be started unless reproduction and channel decoding of all the reproduction data for one block are completed. Unless decoding of all the data in the block is completed, the user data cannot be taken out from the buffer memory. Thus, the latency time therefor is a fixed delay at the time of recording/reproduction. As the ECC block size increases, the fixed delay increases in proportion to the block size.

In the case where special recording/reproduction is carried out such as after-recording for reproducing, processing and then recording data during a short period of time by effectively utilizing the random accessibility as a feature of the optical disc, it is desired that the fixed delay at the time of recording/reproduction is as short as possible.

In the case of special recording/reproduction such as after-recording, it is necessary to have a buffer memory corresponding to the time required for data processing between reproduction operation and recording operation and for access on the disc, in order to carry out continuous reproduction operation at a high speed, data processing and then continuous recording operation for securing a transfer rate. Also, not only a transfer rate which is approximately twice higher is required for carrying out reproduction and recording operation, but also the transfer rate needs to be higher for the time required for data processing and for access on the disc.

In the case of after-recording, it is considered that data may be recorded at a position on the disc from where it is reproduced. In the case of continuous reproduction and recording, too, the recording position is close to the reproduction position. Therefore, only a short access time is required and the data processing time may be problematical. In general, a frame synchronizing signal FS is provided at the header part of a frame. If bit slip is generated, re-synchronization can be carried out by using the frame synchronizing signal FS. If bit slip is generated at a halfway point of a frame, the timing is shifted in the portion following that point and demodulation cannot be carried out accurately, or the position of demodulated data is shifted. As a result, a data error is generated. After that, when a frame synchronizing signal FS is detected at the header part of the next frame, the correct timing is obtained and the data is accurately reproduced. That is, the data immediately after the frame synchronizing signal FS is more resistant to an error caused by bit slip, in comparison with the data immediately before the frame synchronizing signal FS.

Meanwhile, there has been recently a remarkable increase in the capacity of the ROM (read only memory) disc and the RAM (random access memory) disc using optical recording. Shortening of the wavelength of a semiconductor laser used for the optical head of the optical disc recording/reproducing device and increase in the numerical aperture (NA) of an objective lens for condensing a light beam onto the information recording surface of the optical disc are realized.

Reduction in the spot size is known as a technique for realizing a high-density phase-change type optical disc having a capacity greater than that of a DVD-RAM. The spot size on the recording medium is substantially provided by λ/NA, and can be reduced by a technique using a short-wavelength semiconductor laser light source made of GaN or ZnSe or a technique of increasing the NA of the objective lens by a two-group lens represented by a solid immersion lens (SIL).

For example, on the assumption of λ=640 nm and NA=0.85, the diameter of the spot is approximately 0.75 μm on the medium. If signals are recorded/reproduced by using RLL(1, 7) modulation, a linear recording density of approximately 0.21 μm/bit can be realized.

As typical modulation codes of a modulation system having a broad detection window of the channel suitable for high-density recording/reproduction, an RLL(1, 7) code and an (2, 7) code are known.

RLL(1, 7) modulation is a type of modulation with a run length limited (RLL) code having a maximum inversion interval of waveform string, in which the minimum run of information (symbol) 0 is 1 and the maximum run is 7.

In RLL (1, 7) modulation, when converting data having a basic data length of m bits to a variable-length code (d, k; m, n; r), for example, data having a basic data length m equal to 2 bits is converted to a variable-length code (1, 7; 2, 3; 2) having a minimum run d of 0 equal to 1 bit, a maximum run k of 0 equal to 7 bits, a basic data length m equal to 2 bits, a basic code length n equal to 3 bits and a maximum constraint length r equal to 2 bits, by using a conversion table including a code for restraining continuation of the minimum length d of 0 of the channel bit string of the RLL(1, 7) code for a predetermined number of times. For this RLL(1, 7) modulation, the following conversion table is used.

| RLL(1, 7; 2, 3; 2) | | |
|---|---|---|
| | Data | Code |
| i = 1 | 11 | 00x |
| | 10 | 010 |
| | 01 | 10x |
| i = 2 | 0011 | 000 00x |
| | 0010 | 000 010 |
| | 0001 | 100 00x |
| | 0000 | 100 001 |

In this RLL(1, 7) modulation, if the bit interval of the recording waveform string is T, the minimum inversion interval Tmin is equal to 2T. If the bit interval of the data string is Tdata, The minimum inversion interval Tmin is equal to $1.33(=(m/n) \times Tmin =(2/3) \times 2)$ Tdata. The maximum inversion interval Tmax is equal to $8(=7+1)T(=(m/n) \times Tdata=(2/3) \times 8Tdata=5.33Tdata$. The detection window Tw is equal to $0.67(=2/3)$ Tdata On the other hand, in RLL(2, 7) modulation, when converting data having a basic data length of m bits to a variable-length code (d, k; m, n; r), for example, data having a basic data length m qual to 2 bits is converted to a variable-length code (2, 7; 1, 3; 2 ) having a minimum run d of 0 equal to 2 bits, a maximum run k of 0 equal to 7 bits, a basic data length m equal to 1 bit, a basic code length n equal to 3 bits and a maximum constraint length r equal to 2 bits, by using a conversion table including a code for restraining continuation of the minimum length d of 0 of the channel bit string of the RLL(2, 7) code for a predetermined number of times. For this RLL(2, 7) modulation, the following conversion table is used.

| RLL(2, 7; 1, 3; 2) | | |
|---|---|---|
| | Data | Code |
| i = 1 | 11 | 10 00 |
| | 10 | 01 00 |
| i = 2 | 011 | 00 10 00 |
| | 010 | 10 01 00 |
| | 000 | 00 01 00 |
| i = 3 | 0011 | 00 00 1000 |
| | 0010 | 00 10 0100 |

In this RLL(2, 7) modulation, if the bit interval of the recording waveform string is T, the minimum inversion interval Tmin $(=(d+1)T)$ is equal to 3T. If the bit interval of the data string is Tdata, the minimum inversion interval Tmin is equal to $1.5(=(m/n) \times Tmin \times (1/2) \times 3)$ Tdata. The maximum inversion interval Tmax $(=(k+1)T)$ is equal to $8(=7+1)T(=(m/n) \times Tmax)Tdata=(1/2) \times 8Tdata=4.0Tdata$. The detection window Tw $(=(m/n) \times T)$ is equal to $0.5(=1/2)Tdata$. In the optical disc system using an optical head having a high-NA objective lens, it is necessary to enhance the error correction capability in order to cope with errors due to the influence of dust particles or scratches on the optical disc surface onto the light beam. To enhance the error correction capability, codes are increased or the ECC block is increased. Moreover, there is proposed a method of interleaving and collectively blocking the error correction codes in order to broaden the ECC block to the size equivalent to one track on the inner circumference of the disc.

If blocked codes are used, a block size of not smaller than 64 KB can be constituted as user data even when general $GF(2^8)$ is used as codes. In addition, the present Assignee has proposed, in the Japanese Publication of Unexamined Patent Application No. Hei 9-285899, an optical disc recording/reproducing method, an optical disc and an optical disc device in which address information is provided as a part of data within a frame so that a common data format is used for both a read-only disc and a recordable disc. According to this technique, in a block format determined as shown in FIG. 3, the code length of the ECC block is 196 (172 information words and 24 parity words), the interleave length is 384, the number of sectors in this block is 16, the number of frames per sector is 49, the number of data within a frame is 96, and the user data per sector is equivalent to 4 KB. The data of 24 bytes within the leading frame of each sector is address information. The direction of data on the disc corresponds to frames 0, 1, 2 , . . . , 783 (blocks=total sectors).

In the block format shown in FIG. 3, the interleave length is long in comparison with the frame length, and the header data of each frame is not on the same code but is concentrated at one of the four codes.

OBJECTS AND SUMMARY OF THE INVENTION

It is an object of the present invention to provide an optical disc recording/reproducing method, an optical disc and an optical disc device for recording/reproduction of data in a disc format such that the fixed delay at the time of recording/reproduction can be reduced.

It is another object of the present invention to provide an optical disc recording/reproducing method, an optical disc and an optical disc device for recording/reproduction of data in a disc format such that correction incapability caused by concentration of data of a specified position within a frame to a specified code can be avoided.

In the case of reproduction, the correction capability with respect to a product code (PRC) can be improved by strategy. However, this can be realized on the assumption that correction processing is carried out for a plurality of times.

On the other hand, in the ECC block formed by interleaving and collectively blocking error correction codes so as to broaden the ECC block to the size corresponding to one track on the inner circumference of the disc for improving the error correction capability, the code structure is in one direction and therefore the number of times of correction is basically one.

At the time of recording, too, the product code must be encoded in two directions, that is, parity generation must be carried out. However, if blocked codes are used, encoding is carried out only in one direction.

Thus, if the block size of the ECC block is the same, the fixed delay at the time of recording/reproduction is smaller for the ECC block using blocked codes which require a smaller number of times of correction, than in the case where the product code is used.

Moreover, the fixed delay at the time of recording/reproduction can be significantly reduced by causing the direction of user data (input/output order) to be equal to the direction of correction codes as shown in FIG. 4. In the case of FIG. 4, the direction of correction codes and the direction of user data are made coincident with each other, using the same capacity as that of the magneto-optical disc prescribed by the ISO.

In the optical disc system having such a disc format that the direction of correction codes and the direction of user data are made coincident with each other, in reproduction, correction operation for reproduction data is carried out from when transmission of data for one ECC block from the demodulator is completed. This is because the direction of correction codes is interleaved with respect to the direction of data on the disc. Then, the user data can be transmitted to the buffer memory from when correction of one code is completed. That is, it is not necessary to wait for correction operation for one ECC block. This is because the direction of correction codes and the direction of user data are made equal to each other.

Similarly, in recording, coding can be started at the time when necessary data for generating one code is transmitted, without waiting for user data for one ECC block from the buffer memory. After that, when coding of one ECC block is completed, the data is transmitted to the modulator and recorded onto the disc.

The operation timing in this optical disc system is shown in FIG. 5, in comparison with the above-described case of the magneto-optical disc system. As shown in FIG. 5, the fixed delay at the time of recording/reproduction can be reduced by the amount of "margin" in reproduction and recording. Also, a margin can be provided for data processing in reproduction and recording. Alternatively, the total data processing time and therefore the buffer memory can be reduced. In addition, since the direction of correction codes is the same as the direction of user data, no memory for data rearrangement is required and the hardware structure can be minimized. Also, since less data transmission/reception takes place between the buffer memory and the external device, bus arbitration can be easily carried out.

Moreover, higher resistance to errors can be obtained by dispersing words within the same code to a broad range of words within the frame.

DISCLOSURE OF THE INVENTION

According to the present invention, data recording/reproduction is carried out, for example, in a format such that interleave processing is performed on error correction codes so as to collectively block the error correction codes into an error correction unit and that the input/output order of user data in an ECC block as an error correction unit is made coincident with the direction of processing of the error correction codes.

Also, according to the present invention, data recording/reproduction is carried out, for example, in a disc format such that the ECC block is constituted by one or more sectors, the sector is constituted by a plurality of frames, the block length of the ECC block is expressed by the following equation, $$\text{block length} = \text{number of sectors} \times \text{number of frames} \times \text{frame length} = \text{code length} \times \text{interleave length}$$

the number of sub-sectors is expressed by the following equation, $$\text{number of sub-sectors} = \text{number of sectors} \times p$$

(where p=number of segments: natural number) and {code length×interleave length}/{segment length× number of sub-sectors} % number of sub-sectors (where % indicates modulo) and the number of sub-sectors are prime numbers, respectively.

Also, according to the present invention, data recording/reproduction is carried out, for example, in a disc format such that the ECC block is constituted by one or more sectors, the sector is constituted by a plurality of frames, the block length of the ECC block is expressed by the following equation, $$\text{block length} = \text{number of sectors} \times \text{number of frames} \times \text{frame length} = \text{code length} \times \text{interleave length}$$

the number of sub-sectors is expressed by the following equation, $$\text{number of sub-sectors} = \text{number of sectors} \times p$$

(where p=number of segments: natural number) and when the code length is divisible by q (where q=number of subblocks: natural number), {{code length/q}×interleave length}/{segment length×number of sub-sectors} % number of sub-sectors (where % indicates modulo) and the number of sub-sectors are prime numbers, respectively.

Moreover, according to the present invention, data recording/reproduction is carried out, for example, in a disc format such that the number of data within the segment is smaller than the number of data within the frame and that the correction code position is updated for each segment while the interleave rule is met in causing the data position on the disc to correspond to the data position on the ECC block.

Also, according to the present invention, data recording/reproduction is carried out, for example, in a disc format such that the correction code position is updated by one byte.

Also, in the optical disc recording/reproducing method and the optical disc device according to the present invention, data recording/reproduction is carried out, for example, in a disc format such that the ECC block is constituted by one or more sectors, the sector is constituted by a plurality of frames, the block length of the ECC block is expressed by the following equation, block length=number of sectors×number of frames×frame length= code length×interleave length and a sector ID is provided holding the following relations.

sector ID length×number of sectors interleave length×k (where k is a natural number)

sector ID length=segment length×p (where p=number of segments: natural number)

Also, in the optical disc recording/reproducing method and the optical disc device according to the present invention, data recording/reproduction is carried out, for example, in a disc format such that {code length×interleave length}/{segment length×number of sectors} % number of sectors (where % indicates modulo) and the number of sectors are prime numbers, respectively.

In addition, according to the present invention, data recording/reproduction is carried out, for example, in a disc format such that the number of sectors is $2^n$ and that {code length×interleave length}/{sector ID length×number of sectors} is an odd number.

Also, in the optical disc recording/reproducing method and the optical disc device according to the present invention, data recording/reproduction is carried out, for example, in a disc format such that the number of data within the segment is smaller than the number of data within the frame and that the correction code position is updated for each segment while the interleave rule is met in causing the data position on the disc to correspond to the data position on the ECC block.

Moreover, according to the present invention, data recording/reproduction is carried out, for example, in a plurality of disc formats having different ECC block sizes in accordance with the setting of the number of sectors and interleave length.

BRIEF DESCRIPTION OF THE DRAWINGS

FIG. 3 schematically shows an exemplary frame structure within an ECC block in a disc format previously proposed by the present Assignee.

FIGS. 7A and 7B schematically show the structure of frames within the ECC block shown in FIG. 6.

FIG. 8 schematically shows the data configuration within a sector in the optical disc system employing the ECC block.

FIG. 9 schematically shows the relation between the data configuration within the sector and ECC (information words and parity).

FIG. 10 schematically shows the frame structure within the ECC block.

FIG. 12 schematically shows user data in the optical disc system.

FIG. 13 schematically shows the frame structure within the ECC block in the case where one ECC block is constituted by one sector.

FIGS. 14A and 14B schematically show another frame structure within the ECC block.

FIG. 15 schematically shows the data configuration within the sector in the case of the frame structure shown in FIGS. 14A and 14B.

FIG. 16 schematically shows the relation between the data configuration within the sector and ECC (information words and parity) in the case of the frame structure shown in FIGS. 14A and 14B.

FIGS. 26A and 26B schematically show the frame structure in the ECC block shown in FIG. 25.

FIG. 27 schematically shows the data configuration within the sector in the optical disc system employing the ECC block shown in FIG. 25.

FIG. 32 schematically shows the data configuration within the sector in the optical disc system employing the ECC block shown in FIG. 30B.

BEST MODE FOR CARRYING OUT THE INVENTION

Preferred embodiments of the present invention will now be described in detail with reference to the drawings.

Figure 1:
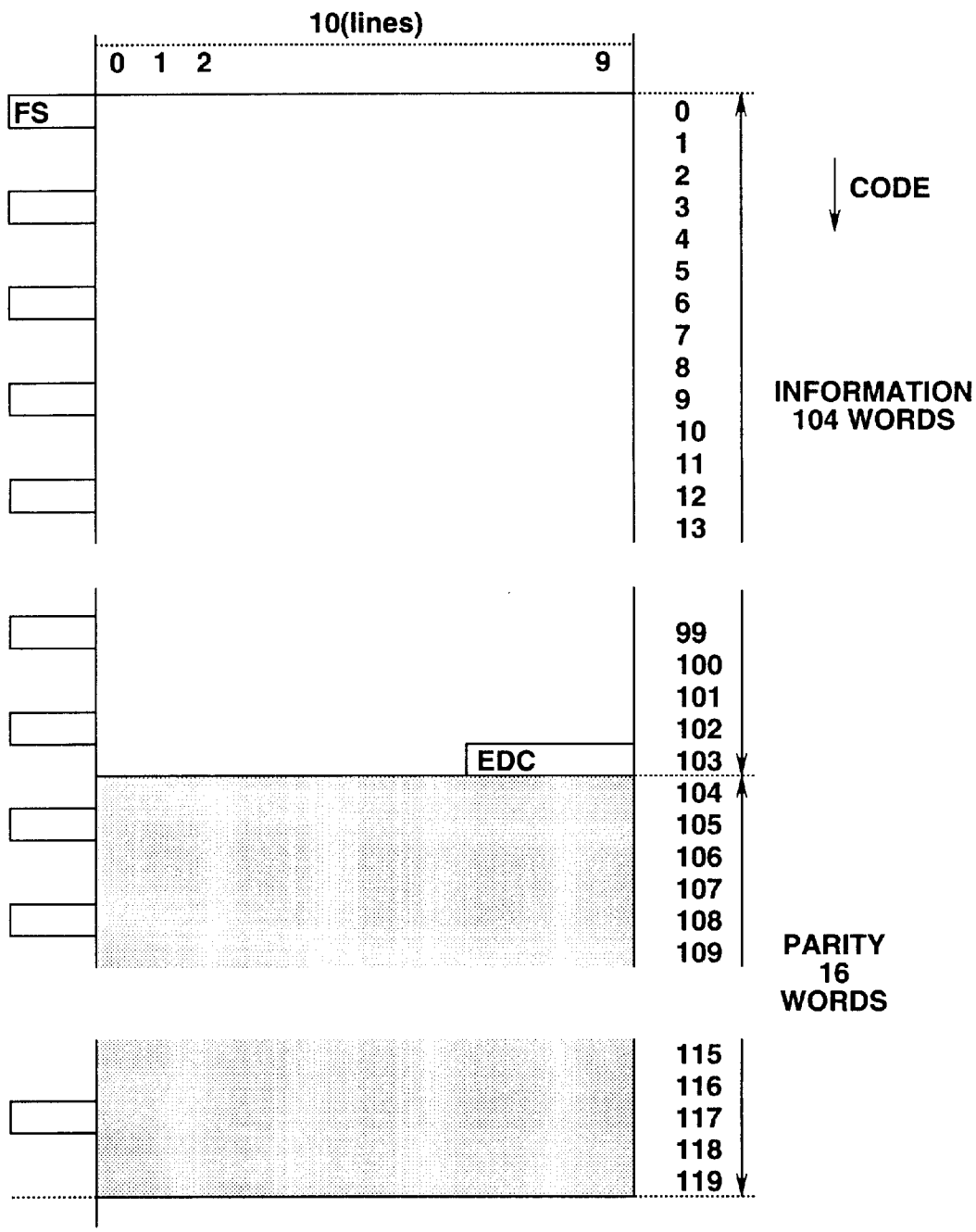
FIG. 1 schematically shows the frame structure within an ECC block in the format of a magneto-optical disc prescribed by the ISO.
Figure 2A:
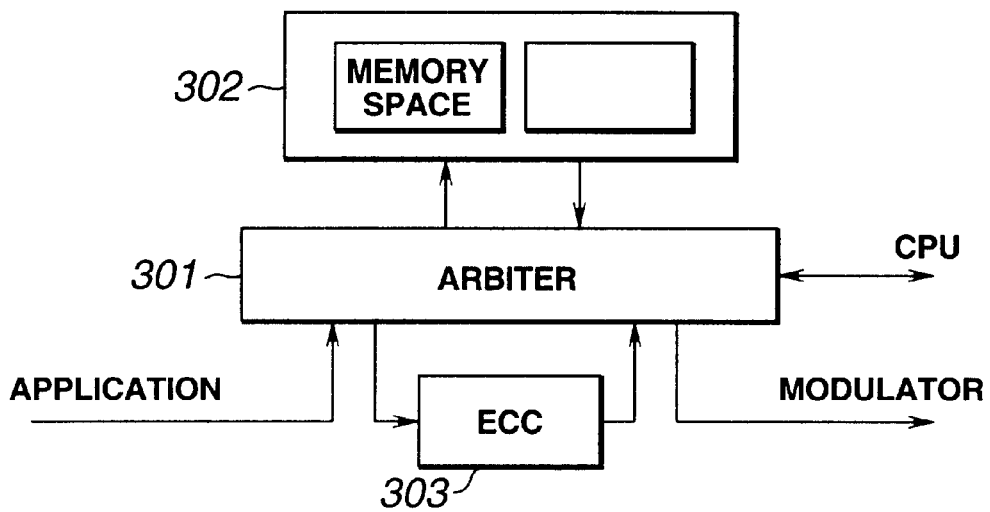
FIGS. 2A and 2B schematically show the flow of data in recording/reproduction operation with respect to the magneto-optical disc prescribed by the ISO.
Figure 2B:
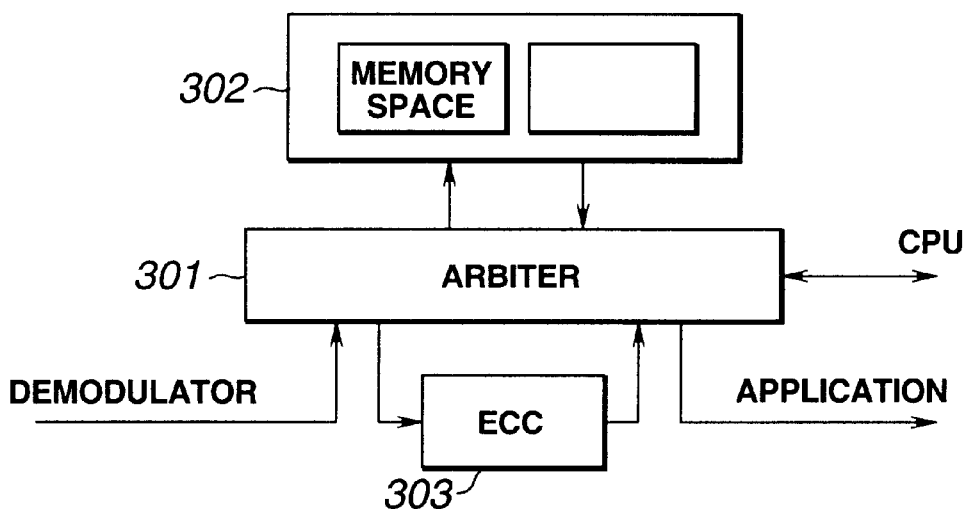
Figure 4:
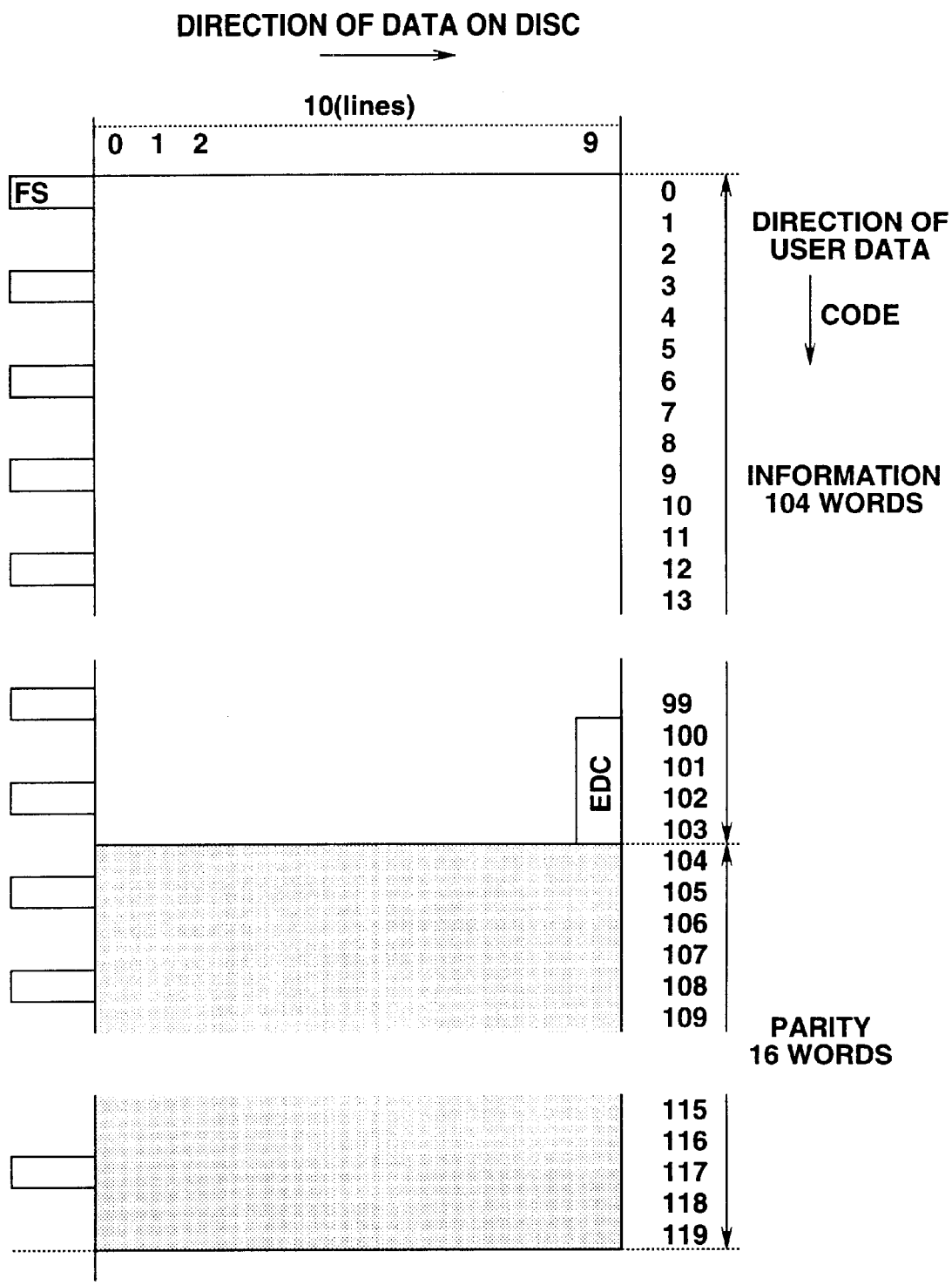
FIG. 4 schematically shows the structure of an ECC block in which the direction of user data is the same as the direction of correction codes.
Figure 5:
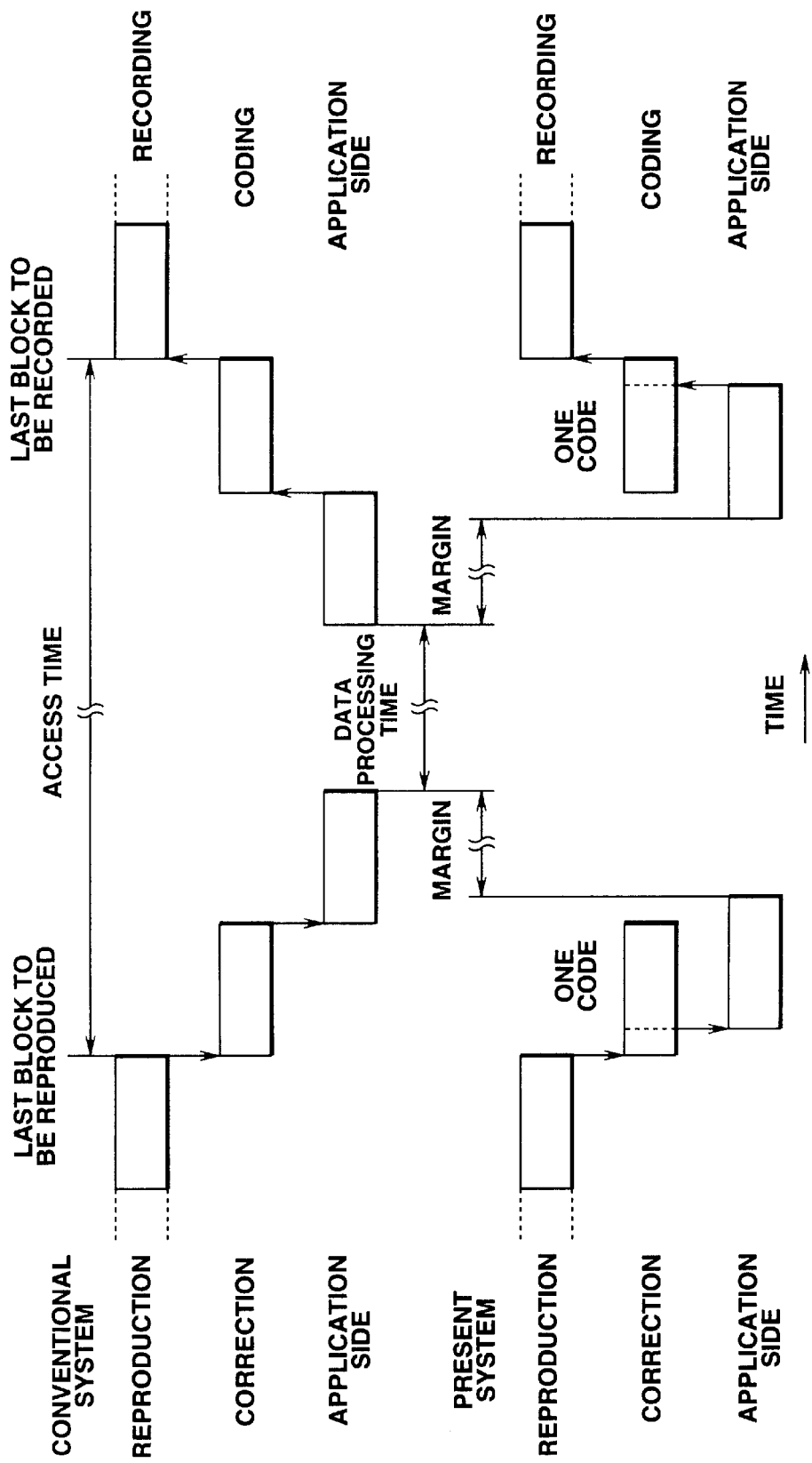
FIG. 5 shows the operation timing in an optical disc system, comparing a conventional ECC block in which the direction of user data is different from the direction of correction codes and an ECC block in which the direction of user data is the same as the direction of correction codes.
Figure 6:
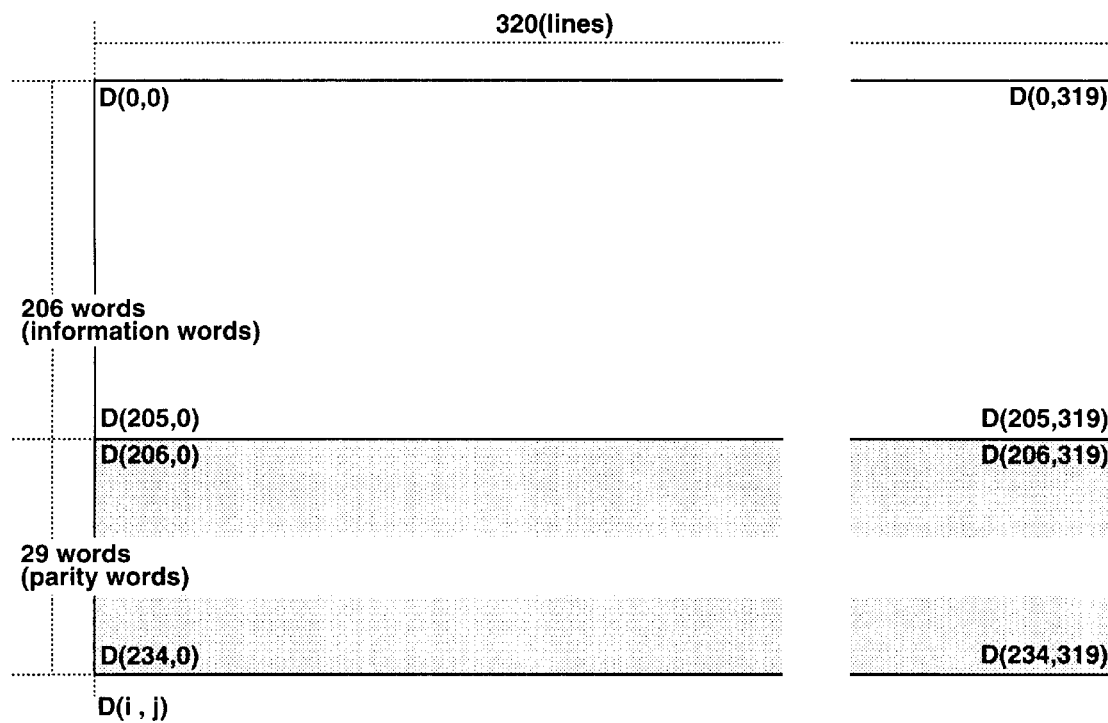
FIG. 6 schematically shows the structure of an ECC block in an optical disc system according to the present invention.

In an optical disc system according to the present invention, an ECC block having a block format as shown in FIG. 6 is employed.

The ECC block shown in FIG. 6 is constituted by binding codes of 206 information words and 29 parity words for 320 lines. Therefore, the ECC block has a code length of 235 (206 information words and 29 parity words) and an interleave length of 320. If each code of 235 words with respect to each "g" is expressed by D(i, j) (where i=0 to 234, j=320 to 319) as shown in FIG. 6, the code is generated to satisfy the following Equation 1.

$$\sum_{i=1}^{234} D_i \cdot x^{(234-i)} = p_D(x) \cdot g_D(x) \quad \text{(Equation 1)}$$

In this Equation 1, g(x) is a generating polynomial and is expressed by $g(x)=(x-\alpha^{28})\cdot(x-\alpha^{27})\ldots(x-\alpha^{2})$, where $\alpha$ is the root of the original polynomial $f(x)=x^8+x^4+x^3+x^2+x^0$ on $GF(2^8)$.

With respect to the data of the ECC block, the number of data of one frame is 100 bytes as shown in the frame structure of FIG. 7A. When this data is (1, 7)-modulated, the number of data equal to 100 bytes per frame is changed to 1200 channels as shown in FIG. 7B. In the frame structures shown in FIGS. 7A and 7B, B(s, t, u, v) is modulated to m(s, t, u, w), where "s" represents the sector, "t" represents the frame, "u" represents the segment, "v" represents the data (bytes), and "w" represents the channel after modulation. In addition, a DCC channel or the like for appending a DCC code to the control of DC components in the (1, 7) modulation system by each DC control cell (DCC) may be provided.

A segment is equivalent to 20 bytes, which is equal to the sector ID length. Since a segment has 20 bytes equivalent to the sector ID length, the number of segments within a frame is 5.

The number of sectors in this ECC block is 16 and the number of frames per sector is 47. The user data per sector is equivalent to 4 KB.

FIG. 8 shows the configuration of recording/reproduction data on the disc. As shown in FIG. 8, a frame sync part FS is appended to the header of a channel string on the frame (channel) basis. Also, APC and VFO parts are appended to the header of every 47 frames (channels) and a postamble PO is appended to the last part, thus constituting one sector. In this case, APC is a light-emitting pattern area for controlling the recording laser power at the time of recording. VFO is a pattern area for applying PLL for clock extraction at the time of reproduction. As the frame sync part FS, a unique pattern for realizing channel synchronization, which does not appear in the modulation rule, is used. In this embodiment, the frame sync FS0 indicating the header of the sector is discriminated from the other frame sync parts FS1. However, a sector sync part SS may be inserted between VFO and FS.

The relation between the data configuration within the sector and ECC (information words and parity) is shown in FIG. 9, and the frame structure within the ECC block is shown in FIG. 10.

In this embodiment, the number of sectors is $16=2^4$, and k=1 holds. Therefore, in causing the data position on the disc to correspond to the data position on the ECC block on the assumption that the code length is an odd number while the number of data within the segment is smaller than the number of data within the frame, a disc format is used such that the correction code position is updated for each segment while the interleave rule is met. Thus, the one-to-one correspondence between the data on the disc and the data on the ECC block can be realized.

In the ECC block shown in FIG. 6, the direction of data on the disc is provided by the rising order of B(s, t, u, v), that is, by the arrangement numbers from the upper position to the lower position in the order of s, t, u and v. The relation between D(i, j) and B(s, t, u, v) is expressed by the following equation.

$$B(s, t, u, v)=D(i, j)=D([(((47\times s)+t)\times 20+v)/20]\%235,((((47\times s)+t)\times 5+u)\times 20+v)/20\%320)$$

In this equation, [r] is the maximum positive integer not exceeding r, and % indicates modulo. This is similarly applied in the following description.

The leading segment of the leading frame of each sector represents the sector ID.

In this embodiment, since the segment has 20 bytes, the number of sectors is 16, the interleave length is 320, and k=1 holds, the following relation is obtained.

segment length×number of sectors=interleave length×k (where k=1)

That is, 20×16=320×1 is obtained. In the above-described arrangement, the sector ID corresponds to the first one word of information words of all the correction codes, and the user data corresponds to the second and subsequent words of information words of all the correction codes. Therefore, the direction of user data can be made equal to the direction of correction codes without being disturbed by the header.

Figure 11:
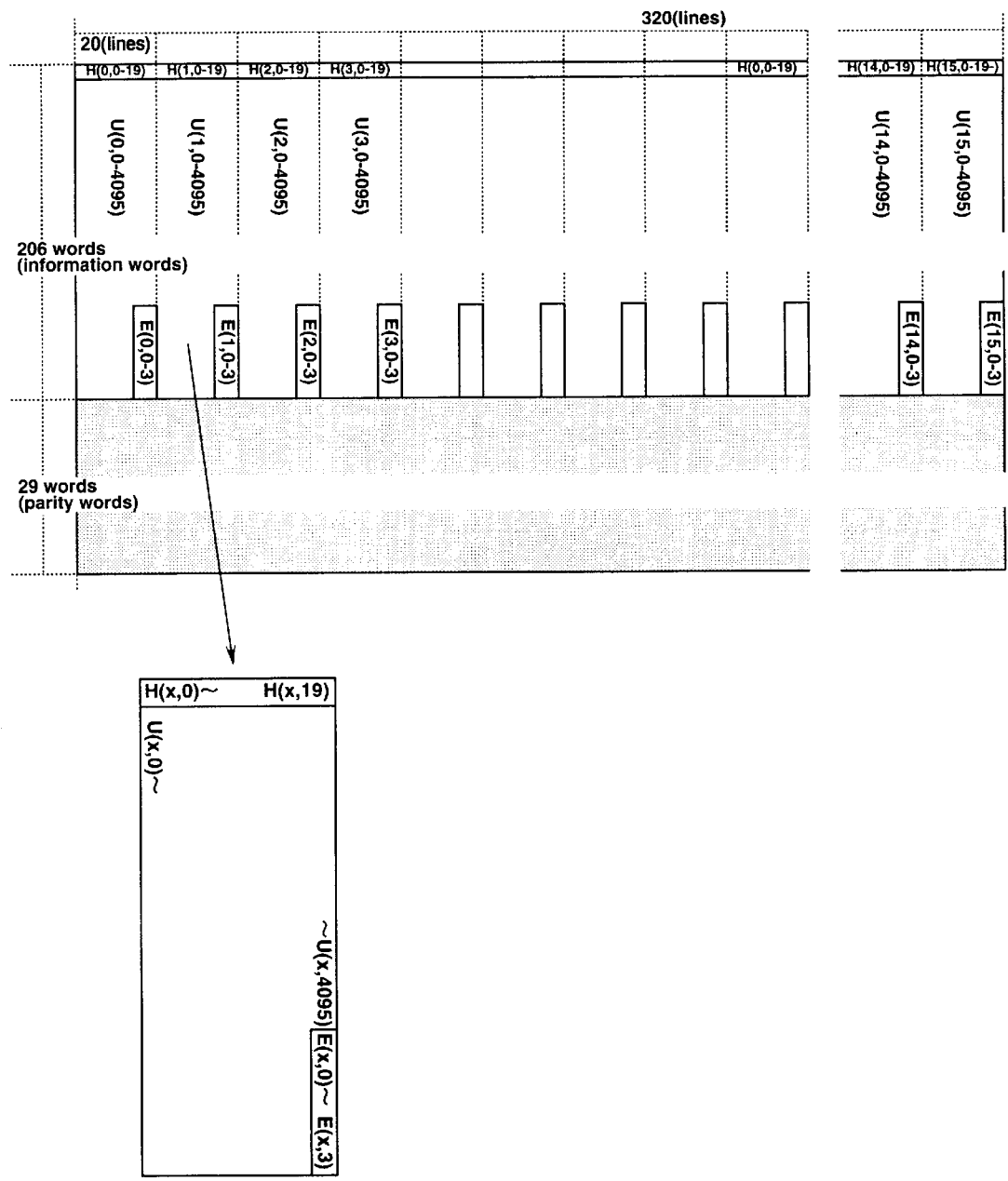
FIG. 11 schematically shows the arrangement and structure of data units within the ECC block.

The arrangement of data units within the ECC block is shown in FIG. 11, and the structure of data units is shown in FIG. 12. H(g, h) is header information, that is, sector ID information. U(g, h) is user data. E(g, h) is an error detection code (EDC) of the user data. "g" is the number of data units, and "h" is the number of data.

The direction of EDC (direction of error detection) may also be the same as the direction of ECC codes. Error detection with EDC is performed on the entire data of the data unit, that is, the user data and EDC.

EDC is generated to satisfy the following Equation 2, for example.

$$\sum_{h=0}^{4095} U_h \cdot x^{(4099-h)} + \sum_{h=0}^{3} E_h \cdot x^{(4099-4096-h)} = p_E(x) \cdot g_E(x) \quad \text{(Equation 2)}$$

In this Equation 2, g(x) is a generating polynomial and is expressed by $g(x)=(x-\alpha^3)\cdot(x-\alpha^2)\cdot(x-\alpha^1)\cdot(x-\alpha^0)$, where $\alpha$ is the root of the original polynomial $f(x)=x^8+x^4+x^3+x^2+x^0$ on $GF(2^8)$.

The header information H(g, h) includes information which is used as ID by, for example, the CPU of the control section, and a part of this information might be used as physical address information such as the sector. In addition, the header information may include information such as the preface of the disc. Moreover, the error detection code may be appended to this information. The sector ID may include an area for dummy data or the like which is replaced by a synchronization pattern. This has no meaning to the application side and the CPU of the control section.

The user data U(g, h) and the result of detection using the error detection code E(g, h) are also used by the CPU of the control section. However, only the user data U(g, h) must be transmitted to the application side.

The arrangement in which the direction of the user data U(g, h) is made equal to the direction of the error detection codes E(g, h) is expressed by the following relational expressions between D(i, j) and U(g, h), E(g, h).

$$U(g, h)=D(i, j)=D((h\times 205)+1, 20\times g+[h/205])$$

where h is 0to 4095 and g is 0to 15

$$E(g, h)=D(i, j)=D(((4096+h)\%205)+1, 20\times g+[(4096+h)/205])$$

where h is 0 to 3 and g is 0 to 15

As for the header information H(g, h), the following relation expression is obtained.

$$H(g, h)=D(i, j)=D(0, 20\times g+h)$$

where h is 0 to 19 and g is 0 to 15

In reproduction, by carrying out EDC check after correction for a necessary quantity, the user data can be immediately sent to the application side. That is, it suffices only to wait for completion of the correction operation for the data unit and it is not necessary to wait for the correction operation for one block. Moreover, after the end of the correction operation of the data unit, it is possible to send the user data to the application side as soon as the required correction operation of codes is completed without waiting for completion of EDC check, then carry out EDC check at the last part of the data unit and send the result to the CPU.

In recording, error correction codes can be generated while the user data is sent from the application side. At the time when transmission of information words of one code is completed, parity words corresponding to the code can be generated.

The error detection codes EDC, too, can be generated at the time when the user data for one data unit is sent.

Thus, by carrying out the EDC generation operation simultaneously with transmission of the user data, then carrying out arithmetic operation with respect to the transmitted information words in the user data portion of each error correction code, and carrying out arithmetic operation with respect to the generated parity in the parity word portion, the error detection codes EDC can be generated.

By using the above-described disc format, the header data (B(x, x, 00)) of the leading segment of each frame is dispersed by the number of sectors at every segment length, and is dispersed to 16 codes for every 20 lines within the interleave length, as shown in FIG. 11. Therefore, correction incapability due to concentration of data of a specified position within a frame to a specified code can be avoided, and higher resistance to errors generated by bit slip can be obtained.

When the number of sectors is to be reduced in order to reduce redundancy such as a pre-header, the above-described sectors may be gathered into an actual sector.

In the case where the data is used for purposes other than AV, for example, for a computer storage, it may be desired to reduce the file size. In the computer storage, a defective area is avoided by substitution. Therefore, in some cases, there may be employed a format for reducing the ECC block even though the error correction capability is lowered. Further, there is also an advantage such that discs of two similar formats can be handled in a common device. For example, though one ECC block is constituted by 16 sectors in the above-described embodiment, an independent ECC block for each sector enables recording/reproduction with discs of the same physical format.

The frame structure within the ECC block in the case where one ECC block is constituted by one sector is shown in FIG. 13.

In the frame structure shown in FIG. 13, data of one sector constitutes one ECC block, and user data of one ECC block constitutes one data unit. In this case, too, the direction of data within the data unit may be the same as the direction of ECC.

The frame structure within the ECC block in the case where the structure of the ECC block is the same as that of FIG. 6 while the number of sectors is 32 is shown in FIGS. 14A and 14B.

In this frame structure, the number of data within a frame is 50 bytes, as shown in FIG. 14A, and 50 bytes per frame is (1, 7)-modulated to 600 channels, as shown in FIG. 14B. That is, a segment has 10 bytes (120 channels) and a frame has 5 segments =50 bytes (600 channels). Address information is included in one segment.

Figure 16:
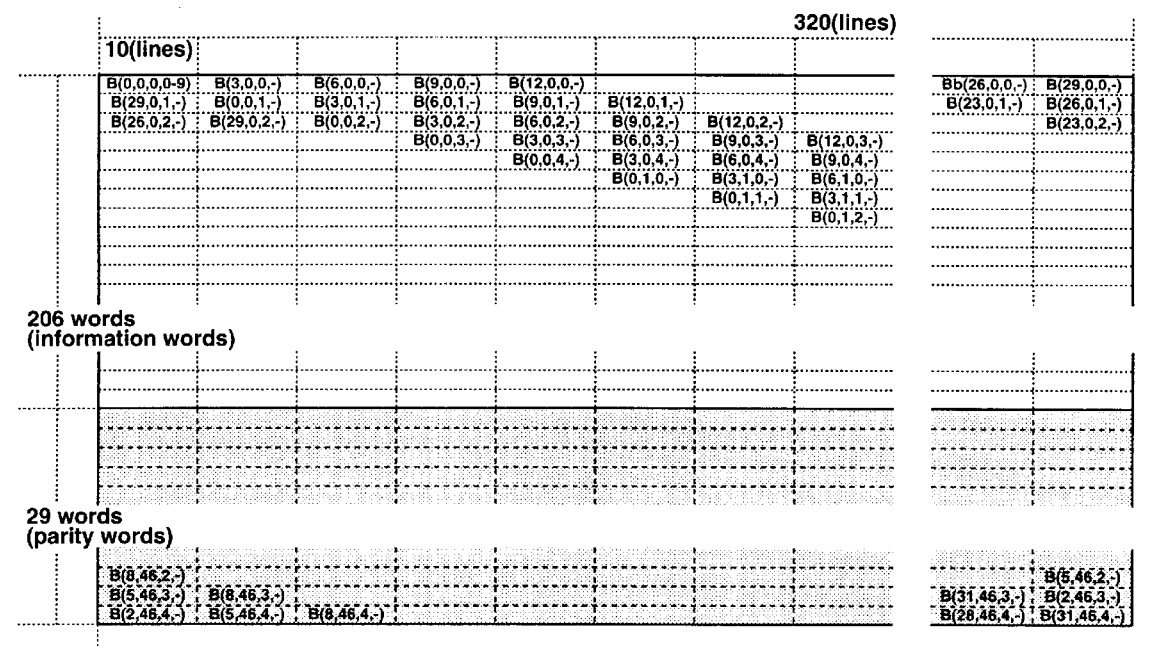

The structure in which the number of sectors within the ECC block is 32 is shown in FIG. 15. The frame structure within the ECC block is shown in FIG. 16.

Figure 17:
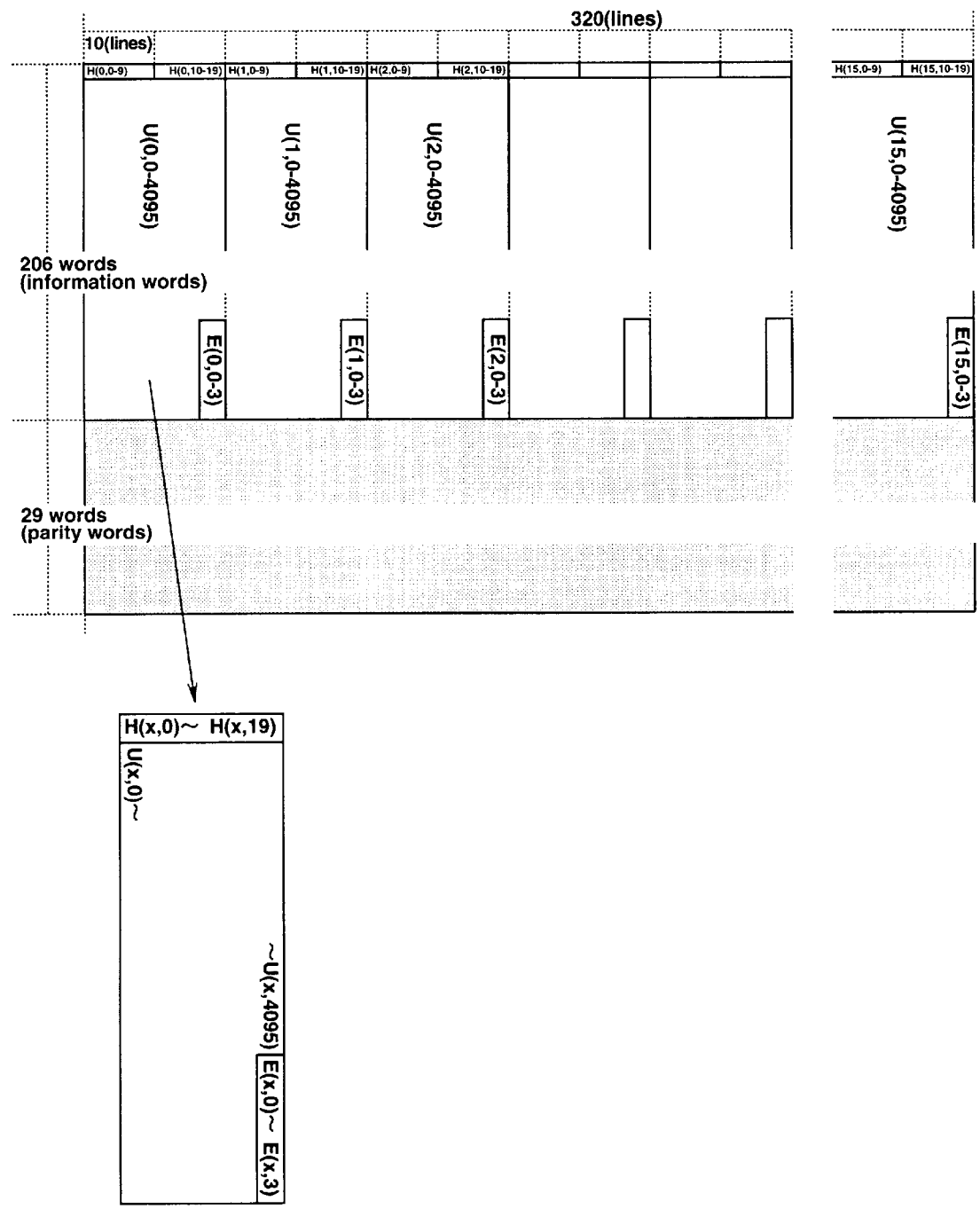
FIG. 17 schematically shows the arrangement and structure of data units within the ECC block in the case of the frame structure shown in FIGS. 14A and 14B.

The arrangement of data units within the ECC block is shown in FIG. 17. As shown in FIG. 17, the number of data units within the ECC block is 16.

In the case where ID information of the data unit is to be sent to the CPU, the address information of sector 0 is expressed by H(0, 0 to 9) and the address information of sector 1 is expressed by H(0, 10 to 19). Then, H(0, 0 to 19) or information necessary for ID obtained therefrom is used as ID information of the data unit 0.

As the number of sectors is thus increased, the segment becomes smaller. Therefore, in comparison with the case of the disc format shown in FIGS. 6 to 12, correction incapability due to concentration of data of a specified position within a frame to a specified code can be avoided further, and higher resistance to errors generated by bit slip can be obtained.

Next, for recording/reproduction of user data onto/from an optical disc of such a format, an optical disc recording/reproducing device having the following structure is used, for example.

Figure 18:
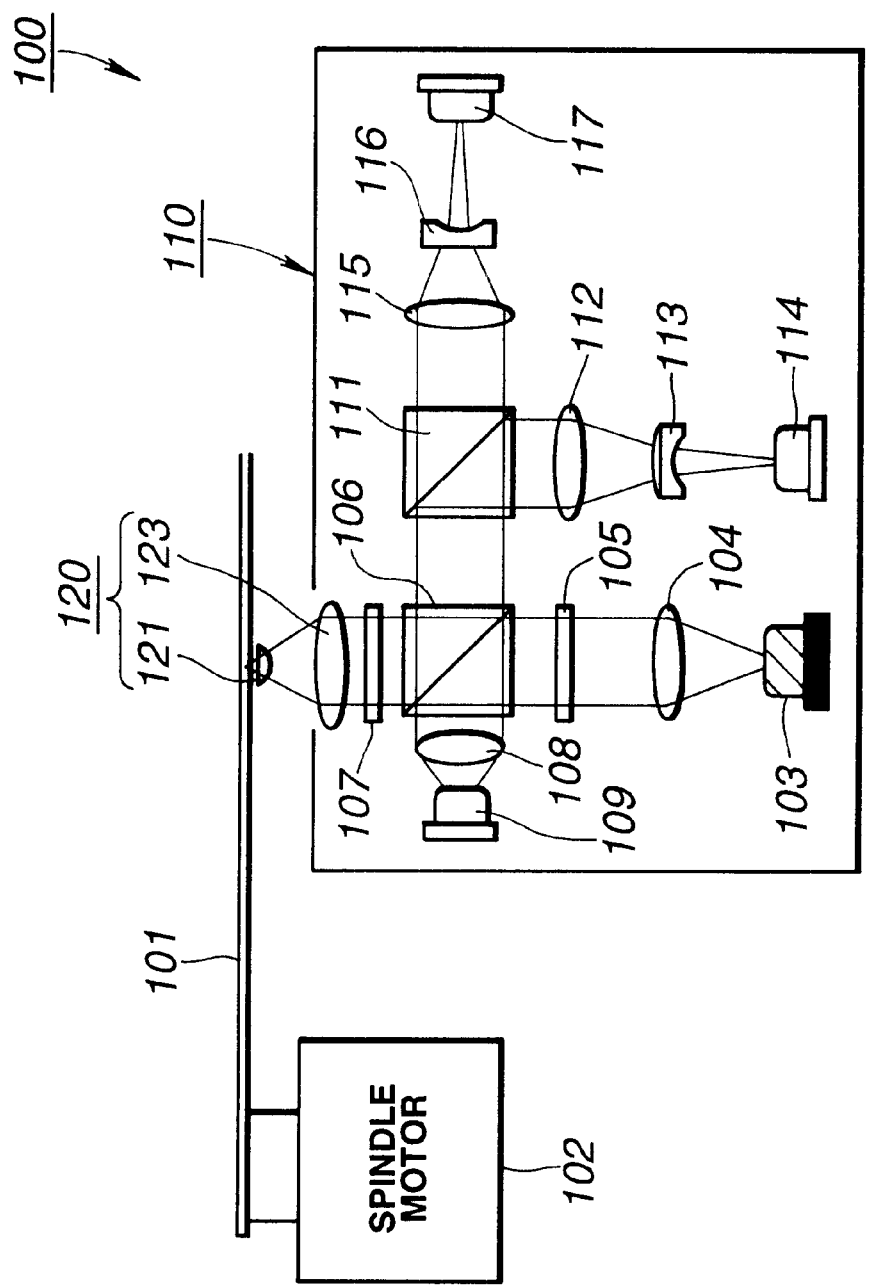
FIG. 18 is a block diagram showing the structure of a disc drive of an optical disc recording/reproducing device for carrying out recording/reproduction of user data onto/from an optical disc according to the present invention.

This optical disc recording/reproducing device has a disc drive 100 of a structure as shown in FIG. 18, in which an optical disc 101 is rotationally driven at a constant angular velocity by a spindle motor 102 while the information recording surface of the optical disc 101 is scanned with a laser beam by an optical head 110, thus optically recording/reproducing information.

The optical head 110 provided in the disc drive 100 has a semiconductor laser (LD) 103 as a light source for radiating a laser beam for recording/reproduction to the optical disc 101 . The light emitted from the semiconductor laser 103 is collimated by a collimating lens 104 and passes through a diffraction grating 105 for size spot generation. After that, the light becomes incident on an aspherical two-group objective lens unit 120 through a beam splitter 106 and a quarter-wave plate 107, and is condensed onto the information recording surface of the optical disc 101 by the aspherical two-group objective lens unit 120. A part of the light emitted from the semiconductor laser 103 is reflected by the beam splitter 106, then led to an emission power monitor detector 109 through a condenser lens 108, and used for automatic power control for controlling the laser power on the information recording surface. A reflected light (that is, a reproduction signal) from the optical disc 101 is reflected by the beam splitter 106 and then led to a detection optical path. A part of this light is reflected by a beam splitter 111, then made incident on a servo signal detector 114 through a condenser lens 112 and a cylindrical lens 113, and then photoelectrically converted. The remaining part of the light is made incident on an RF signal detector 117 through lenses 115, 116 and then photoelectrically converted. In this optical head 110, a focusing error signal is generated by using an astigmatic method, and a tracking error signal is generated by using a differential push-pull method. In this case, a servo error signal and a reproduction RF signal are detected by the two signal detectors 114, 117. However, only one detector may suffice.

Figure 19:
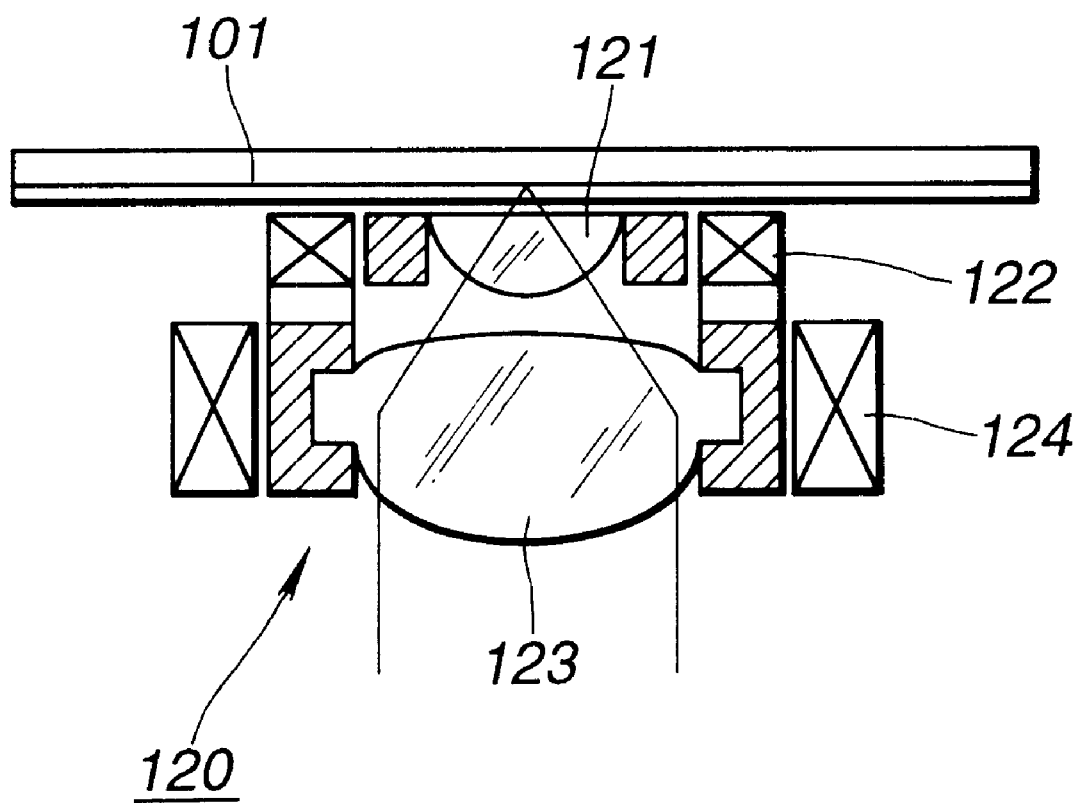
FIG. 19 is a schematic cross-sectional view showing the structure of an aspherical two-group objective lens unit provided in an optical head of the disc drive.

The aspherical two-group objective lens unit 120 has a first electromagnetic actuator 122 for driving a first lens 121, and a second electromagnetic actuator 124 for driving a second lens 123, as shown in FIG. 19. The second lens 123 is mounted on the second electromagnetic actuator 124 movable in the direction of optical axis and in the direction of tracks, and has a numerical aperture of approximately 0.5. The first lens 121 is mounted on the first electromagnetic actuator 122 different from the second electromagnetic actuator 124, above the second lens 123, and is controllable at an arbitrary position on the optical axis.

Figure 20:
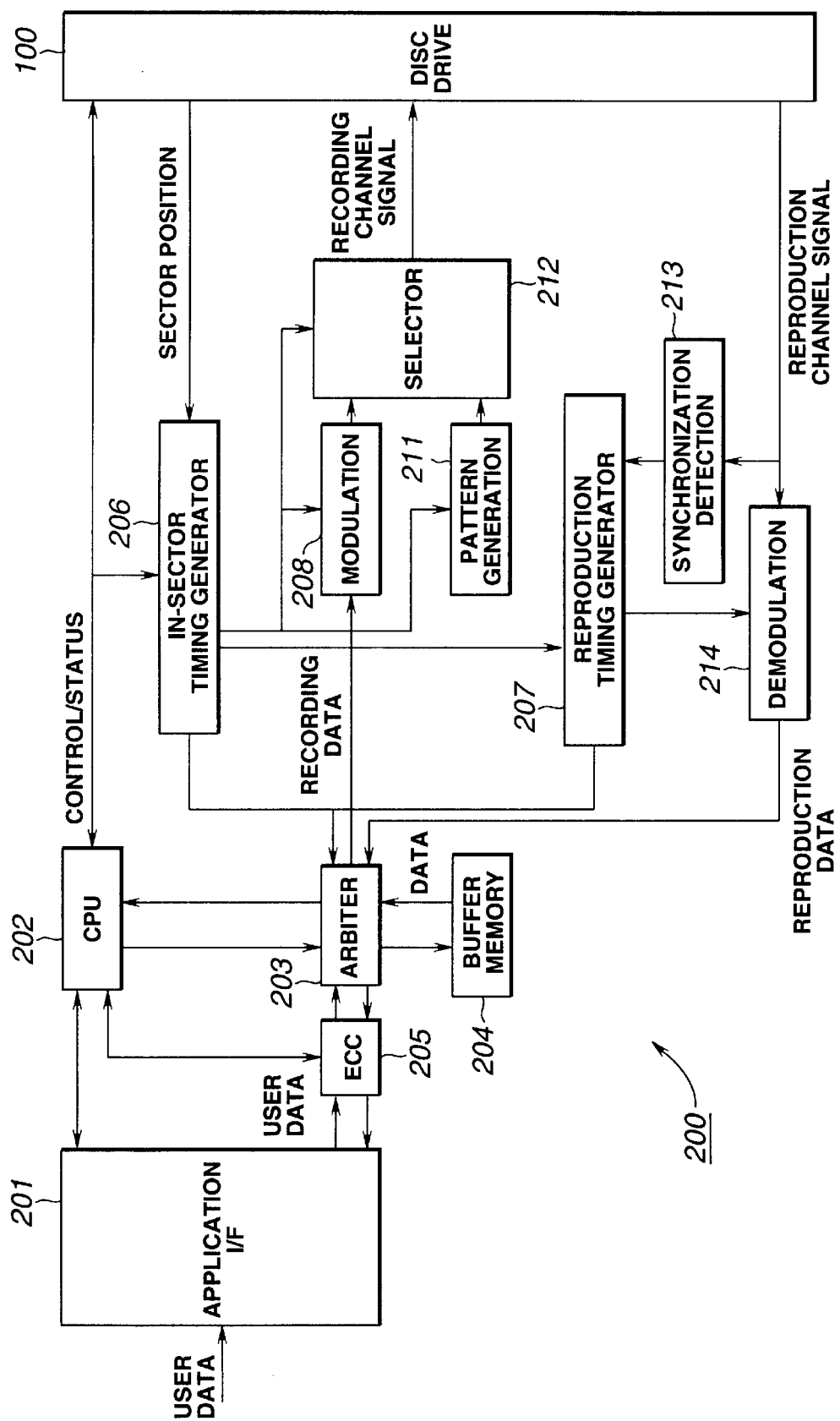
FIG. 20 is a block diagram showing a recording/reproduction processing unit in the optical disc recording/reproducing device.

This optical disc recording/reproducing device has a recording/reproduction processing block 200 having a structure as shown in FIG. 20 and connected to the disc drive 100 for carrying out recording/reproduction by scanning the information recording surface of the optical disc 100 by the optical head 110.

This recording/reproduction processing block 200 has a computer or central processing unit (CPU) 202 and an arbitration processing section 203 for carrying out transmission/reception of user data and control data to/from the application side through an application I/F circuit 201. A buffer memory 204 and an ECC processing section 205 are connected to the arbitration processing section 203. Also, an in-sector timing generator 206 and a reproduction timing generator 207 are connected to the arbitration processing section 203.

The recording/reproduction processing block 200 also has a modulation section 208 to which recording data is supplied from the arbitration processing section 203 at the time of recording, and a pattern generation section 211 and a selector section 212 which operate in accordance with a timing signal provided by the in-sector timing generator 206. The modulation section 208 performs modulation processing conformable to the RLL(1, 7) modulation rule on the recording data supplied from the arbitration processing section 203, and supplies the modulation output to the selector section 212. The pattern generation section 211 generates APC, VFO and PO patterns. The selector section 212 selects the outputs of the modulation section 208 and the pattern generation section 211 in accordance with a timing signal provided by the in-sector timing generator 206, thus generating and supplying a recording channel signal to the disc drive 100.

The in-sector timing generator 206 carries out RLL(2, 7) demodulation on a reproduction signal of an address area (sector ID area) AR2 of the optical disc 101 supplied from the disc drive 100 so as to obtain address information, and supplies the address information as sector position information to the CPU 202. Also, the in-sector timing generator 206 generates each timing signal within the sector on the basis of the sector position information, and controls the operation of the modulation section 208, the pattern generation section 211 and the selector section 212 at the time of recording. At the time of reproduction, the in-sector timing generator 206 supplies a reference timing signal to the reproduction timing generator 207. The CPU 202 carries out access control for recording/reproducing the user data on the basis of the control data provided from the application side and the sector position information provided by the in-sector timing generator 206.

Moreover, the recording/reproduction processing block 200 has a synchronization detection section 213 and a demodulation section 214, to both of which a reproduction channel signal is supplied from the disc drive 100 at the time of reproduction. The synchronization detection section 213 detects a synchronizing signal included in the reproduction channel signal and supplies the detected synchronizing signal to the reproduction timing generator 207. Then, the demodulation section 214 carries out RLL(1, 7) demodulation processing, on the reproduction channel signal, corresponding to RLL(1, 7) modulation processing in the modulation section 208 on the basis of a timing signal provided by the reproduction timing generator 207 so as to generate reproduction data, and supplies the reproduction data to the arbitration processing section 203.

Figure 21A:
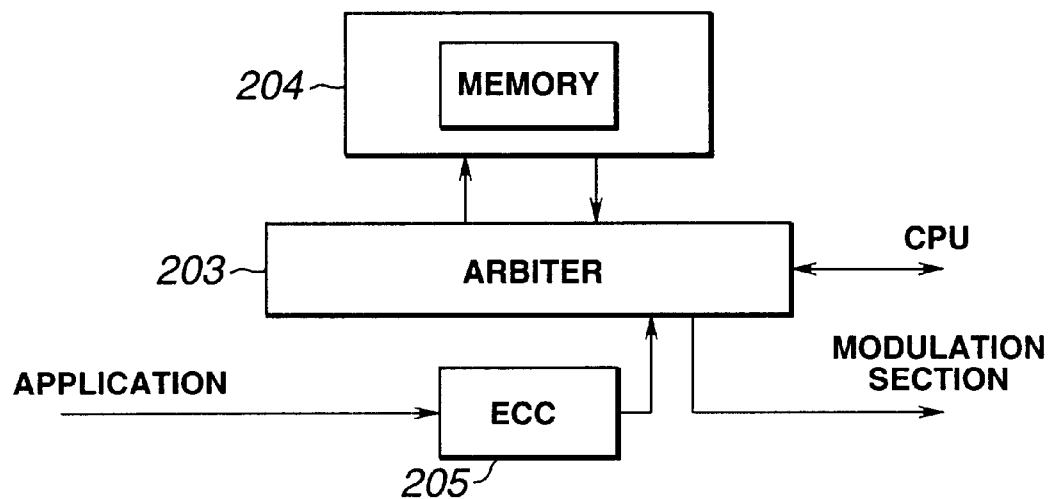
FIGS. 21A and 21B schematically show the flow of data in recording/reproduction operation carried out by the optical disc recording/reproducing device.

In the recording/reproduction processing block 200 of such a structure, in recording, user data is sent from the application side to the ECC processing section 205 and ID information and reserved data are sent from the CPU 202, as shown in FIG. 21A. Then, IDE generation and EDC generation are carried out by the ECC processing section 205 and ECC encoding is carried out. Thus, data within the ECC block is prepared on the buffer memory 204.

The ECC processing section 205 starts coding at the time when necessary data for generating one code is supplied, without waiting for arrival of user data for one ECC block onto the buffer memory 204.

After that, when coding for one ECC block is completed, the data within the ECC block prepared on the buffer memory 204 is RLL(1, 7)-modulated by the modulation section 208 at the timing of the sector to be recorded, indicated by a timing signal from the in-sector timing generator 206. The modulated data is sent to the disc drive 100 through the selector section 212, as a recording channel signal to which the APC, VFO, SS and PO patterns generated by the pattern generation section 211 are appended. The recording channel signal is then recorded into the user area of the optical disc 101.

In this case, in the arbitration processing section 203, rearrangement of the respective data is carried out by arbitrating address signals for the buffer memory generated from each block.

Figure 21B:
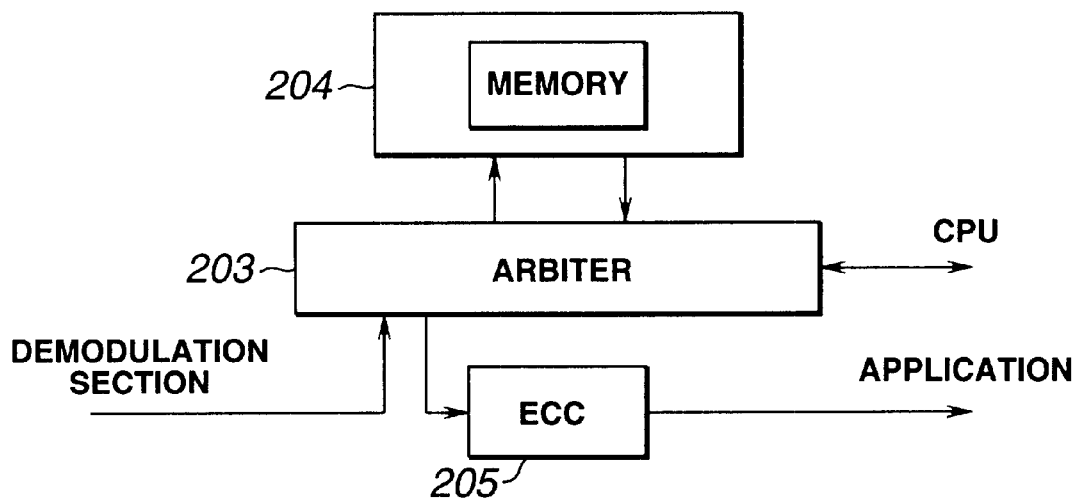

On the other hand, in reproduction, a synchronizing signal is detected from a reproduced reproduction channel signal by the synchronization detection section 213 and is supplied to the reproduction timing generator 207, thus performing synchronization protection. Then, RLL(1, 7) demodulation is carried out by the demodulation section 214 on the basis of the timing and reproduction data is sent to the buffer memory 204, as shown in FIG. 21B. Then, ECC decoding is carried out by the ECC processing section 205 and EDC check and IDE check are carried out. In the ECC processing section 205, correction operation for the reproduction data is started at the time when transmission of data for one ECC block from the demodulation section 214 is completed, and transmission of the user data is started at the time when correction of one code is completed. That is, it is not necessary to wait for the correction operation for one ECC block.

In the above-described embodiments, the code position (word) is updated on the segment basis corresponding to the length of header, that is, sector ID. However, in realizing correspondence of the data position on the disc to the data position on the ECC block on the assumption that the number of data within the segment is smaller than the number of data within the frame, the correction code position may be updated for each segment while the interleave rule is met, and data recording/reproduction may be carried out in a disc format such that the ECC block is constituted by one or more sectors, the sector is constituted by a plurality of frames, the block length of the ECC block is expressed by the following equation, block length=number of sectors×number of frames×frame length=code length×interleave length the number of sub-sectors is expressed by the following equation, number of sub-sectors=number of sectors×p (where p=number of segments: natural number) and {code length×interleave length}/{segment length×number of sub-sectors} % number of sub-sectors (where % indicates modulo) and the number of sub-sectors are prime numbers, respectively.

Figure 22:
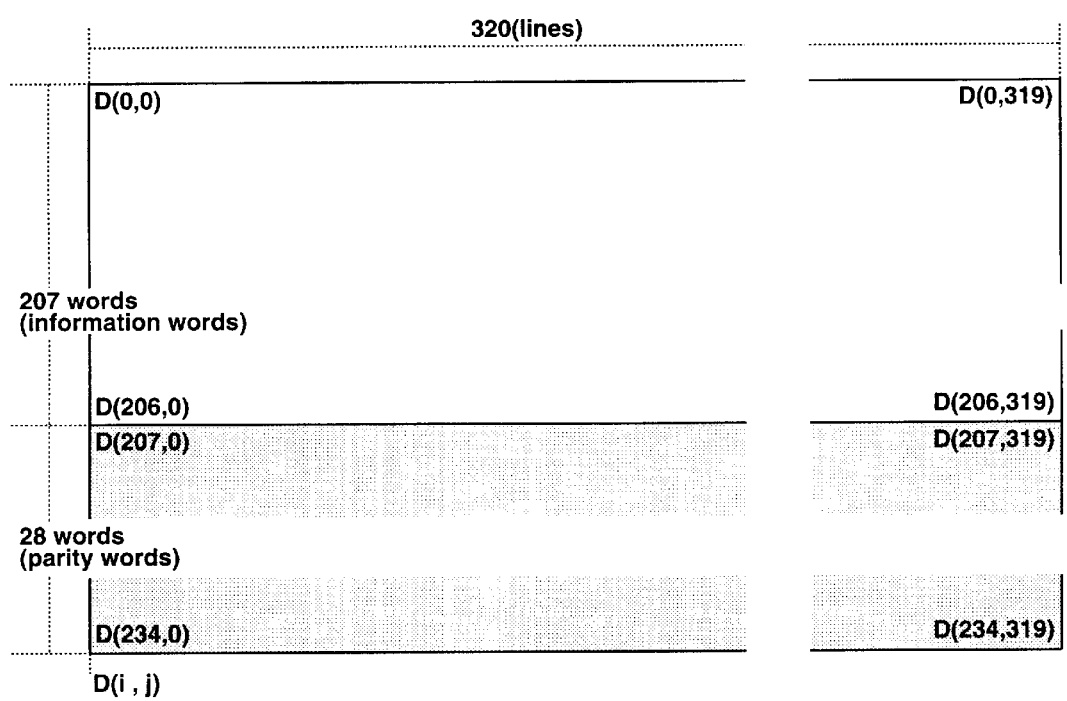
FIG. 22 schematically shows another structure of the ECC block in the optical disc system according to the present invention.

For example, with respect to an ECC block in which the code length obtained by binding and blocking codes of 207 information words and 28 parity words for 320 lines is 235 (207 information words and 28 parity words) and in which the interleave length is 320, as shown in FIG. 22, the data has the frame structure shown in FIG. 7 and has the data configuration within the segment shown in FIG. 8, similarly to the ECC block having a code length of 235 (206 information words and 29 parity words) and an interleave length of 320 shown in FIG. 6.

That is, the ECC block shown in FIG. 6 is the same as an ECC block having the following structure.

number of sectors=16, number of frames=47, frame length=100 bytes
code length=235, interleave length=320
sector ID=20, k=1
segment length=20, p=1, number of sub-sectors=16

As for the ECC block shown in FIG. 22, the user data within the ECC block is 64 KB and the number of constituent sectors is 16.

Figure 23:
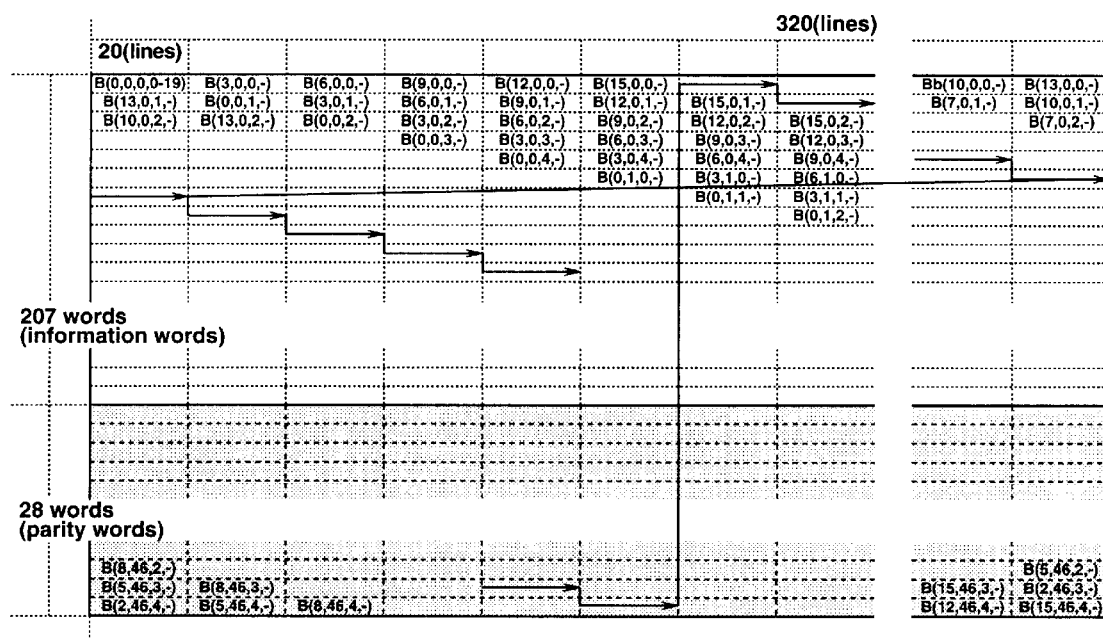
FIG. 23 schematically shows the frame structure within the ECC block shown in FIG. 22.
Figure 24:
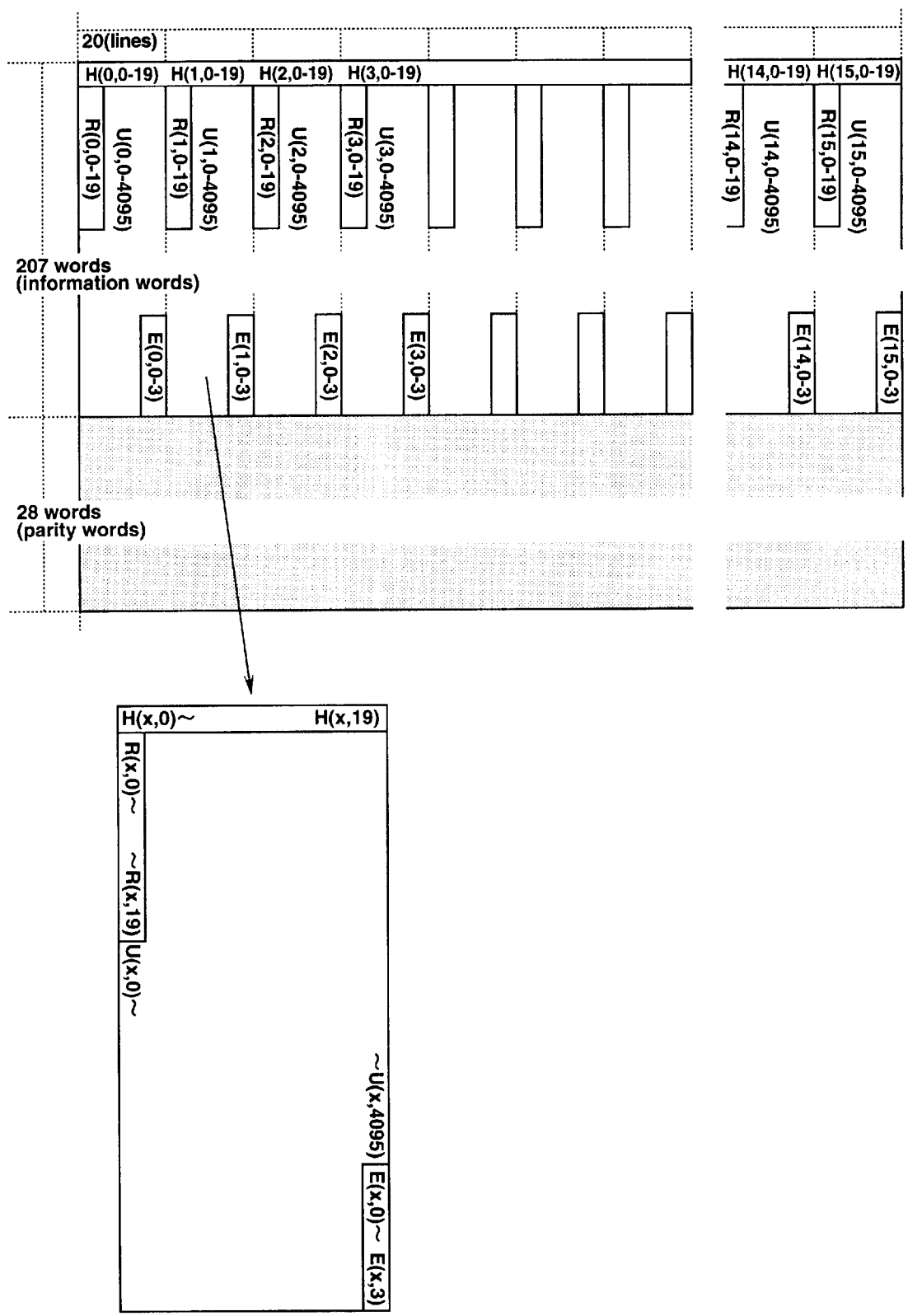
FIG. 24 schematically shows the arrangement and structure of data units within the ECC block shown in FIG. 22.

The frame structure within the ECC block of this case is shown in FIG. 23, and the arrangement and structure of data units are shown in FIG. 24. H(g, h) represents header information, that is, sector ID information. R(g, h) represents 20-byte information at the leading part of each data unit. U(g, h) represents user data. E(g, h) represents an error detection code (EDC) of the user data. "g" is the number of data units, and "h" is the number of data.

In the ECC block shown in FIG. 22, the direction of data on the disc is provided by the rising order of B(s, t, u, v), that is, by the arrangement numbers from the upper position to the lower position in the order of s, t, u and v. The relation between D(i, j) and B(s, t, u, v) is expressed by the following equation.

$$B(s, t, u, v)=D(i, j)=D([((((47\times s)+t)\times 5+u)\times 20+v)/20]\%235, ((((47\times s)+t)\times 5+u)\times 20+v)/20\%320)$$

The arrangement in which the direction of the user data U(g, h) is made equal to the direction of the error detection codes E(g, h) is expressed by the following relational expressions between D(i, j) and R(g, h), U(g, h), E(g, h).

$$R(g, h)=D(i, j)=D((h\%206)+1, 20\times g+[h/206])=D(h+1, 20\times g)$$

where h is 0 to 19 and g is 0 to 15

$$U(g, h)=D(i, j)=D(((20+h)\%206)+1, 2033\ g+[(20+h)/206])$$

where h is 0 to 4095 and g is 0 to 15

$$E(g, h)=D(i, j)=D(((4116+h)\%206)+1, 20\times g+[(4116+h)/206])$$

where h is 0 to 3 and g is 0 to 15
As for the header information H(g, h), the following relation expression is obtained.

$$H(g, h)=D(i, j)=D(0, 20\times g+h)$$

where h is 0 to 19 and g is 0 to 15
Thus, in the ECC block shown in FIG. 22, specified data within the frame, for example, the leading data of the frame are dispersed to 16 positions at every 20 codes. The sector ID has 20 bytes at the leading part of each sector.

The ECC block shown in FIG. 13 in which one ECC block is constituted by one sector is the same as an ECC block having the following structure.

number of sectors=1, number of frames=47, frame length=100 bytes
code length=235, interleave length=20
sector·ID=20, k=1
segment length=20, p=1, number of sub-sectors=1

In this ECC block, the user data within the ECC block has 4 KB and the number of constituent sectors is 1. The leading data of the frame are dispersed to one position at every 20 codes. The sector ID has 20 bytes at the leading part of each sector.

Further, the ECC block of the format shown in FIGS. 14 to 17 is the same as an ECC block having the following structure.

number of sectors=32, number of frames=47, frame length=50 bytes
code length=235, interleave length=320
sector ID=10, k=1
segment length=10, p=1, number of sub-sectors=32

In this ECC block, the user data within the ECC block has 64 KB and the number of constituent sectors is 32. The leading data of the frame are dispersed to 32 positions at every 10 codes. The sector ID has 10 bytes at the leading part of each sector.

In the ECC block shown in FIG. 22,the user data within the ECC block has 64 KB and the number of constituent sectors is 16, similarly to the ECC block shown in FIG. 6. Thus, the sector ID is concentrated. However, in an ECC block having a structure such that number of sectors=16, number of frames=100, frame length=47 bytes
code length=235, interleave length=320
sector ID=20, k=1
segment length=5, p=4, number of sub-sectors=64,
the number of user data within the ECC block is 64 KB and the number of constituent sectors is 16. The leading data of the frame are dispersed to 64 positions at every five codes. Thus, the sector ID is dispersed to four positions for every five bytes.

Moreover, in an ECC block having a structure such that
number of sectors=16, number of frames=50, frame length=94 bytes
code length=235, interleave length=320
sector ID=20, k=1
segment length=10, p=2, number of sub-sectors=32, the number of user data within the ECC block is 64 KB and the number of constituent sectors is 16. The leading data of the frame are dispersed to 32 positions at every 10 codes. Thus, the sector ID is dispersed to two positions for every 10 bytes.

By thus dispersing specified words within the frame, that is, sector ID, higher resistance to errors can be obtained.

In addition, in realizing correspondence of the data position on the disc to the data position on the ECC block on the assumption that the number of data within the segment is smaller than the number of data within the frame, specified words within the frame may be dispersed to a broad range by updating the correction code position for each byte while meeting the interleave rule.

Figure 25:
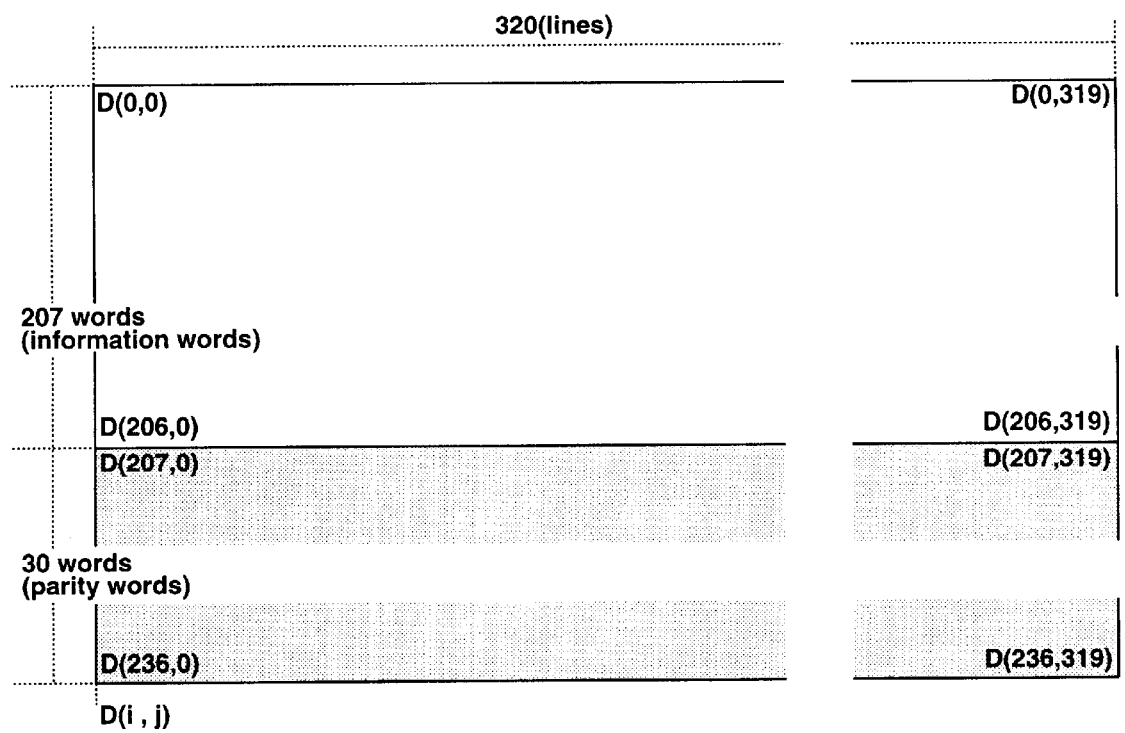
FIG. 25 schematically shows another structure of the ECC block in the optical disc system according to the present invention.

For example, in an ECC block in which the code length obtained by binding and blocking codes of 207 information words and 30 parity words for 320 lines is 237 (207 information words and 30 parity words) and in which the interleave length is 320, as shown in FIG. 25, the number of data of one frame of the ECC block is 79 bytes as shown in the frame structure of FIG. 26A, and is modulated to 948 channels by (1, 7) modulation as shown in FIG. 26B.

In the frame structure shown in FIGS. 26A and 26B, B(s, t, u, v) is modulated to im(s, t, u, w), where "s" represents the sector, "t" represents the frame, "u" represents the segment, "v" represents the data (bytes), and "w" represents the channel after modulation. In addition, a DCC channel or the like for appending a DCC code to the control of DC components in the (1, 7) modulation system by each DC control cell (DCC) may be provided.

The configuration of recording/reproduction data on the disc is shown in FIG. 27. As shown in FIG. 27, a frame sync part FS is appended to the header of a channel string on the frame (channel) basis. Also, APC and VFO parts are appended to the header of every 60 frames (channels) and a postamble PO is appended to the last part, thus constituting one sector. In this case, APC is a light-emitting pattern area for controlling the recording laser power at the time of recording. VFO is a pattern area for applying PLL for clock extraction at the time of reproduction. As the frame sync part FS, a unique pattern for realizing channel synchronization, which does not appear in the modulation rule, is used. In this embodiment, as the frame sync FS, the frame sync FS0 indicating the header of the sector is discriminated from the other frame sync parts FS1. However, a sector sync part SS may be inserted between VFO and FS.

In this ECC block, the following structure is employed.
number of sectors=16, number of frames=60, frame length 79 bytes
code length=237, interleave length=320
sector ID=20, k 1
segment length=1, p=20, number of sub-sectors=320

Thus, in realizing correspondence of the data position on the disc to the data position on the ECC block, the correction code position is updated for each segment, that is, for each byte while the interleave rule is met. By doing so, the one-to-one correspondence between the data on the disc and the data on the ECC block can be realized.

Figure 28:
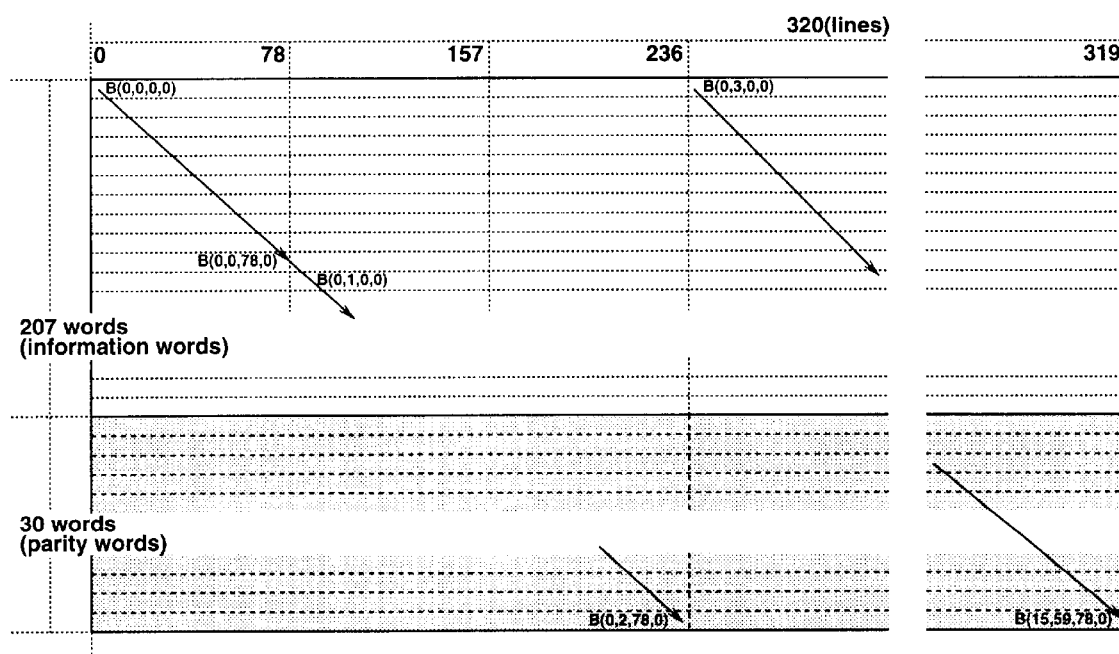
FIG. 28 schematically shows the frame structure within the ECC block shown in FIG. 25.

The frame structure within the ECC block is shown in FIG. 28.

In the ECC block shown in FIG. 25, the direction of data on the disc is provided by the rising order of B(s, t, u, v), that is, by the arrangement numbers from the upper position to the lower position in the order of s, t, u and v. The relation between D(i, j) and B(s, t, u, v) is expressed by the following equation.

$$B(s, t, u, v)=D(i, j)=D([((((60\times s)+t)\times 79+u)\times 1+v)/1]\%237, ((((60\times s)+t)+t)\times 79+u)\times 1+v)\%320)$$

By this arrangement, the one-to-one correspondence between the data of one block on the disc and the entire data on the ECC block can be realized while the interleave rule is met. In this case, the header, that is, sector ID corresponds to the first one word of information words of all the correction codes, and the user data corresponds to the second and subsequent words of information words of all the correction codes. Therefore, the direction of user data can be made equal to the direction of correction codes without being disturbed by the header.

Figure 29:
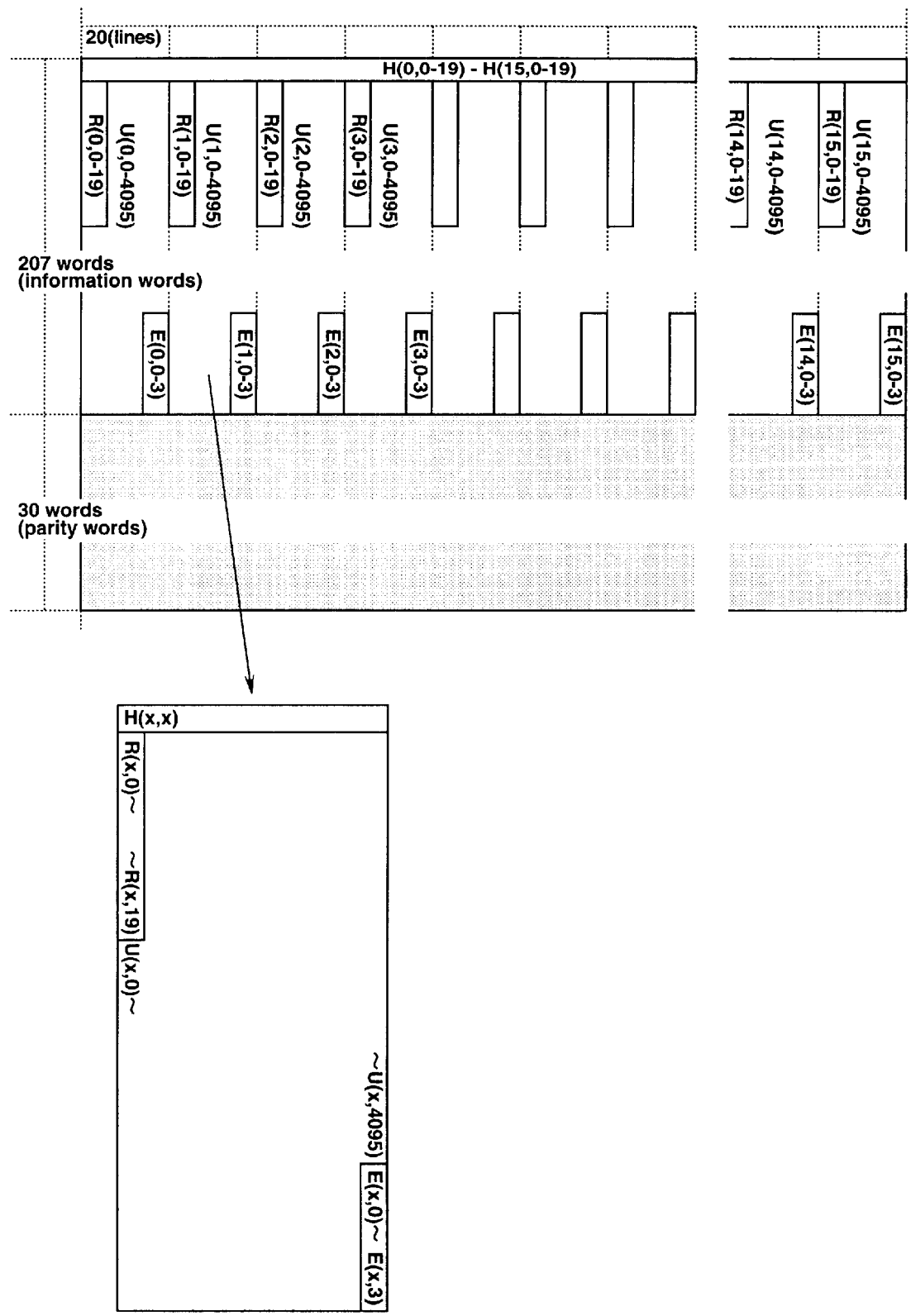
FIG. 29 schematically shows the arrangement and structure of data units within the ECC block shown in FIG. 25.

The arrangement of data units within the ECC block and the structure of data units are shown in FIG. 29. H(g, h) is header information, that is, sector ID information. R(g, h) is 20-byte information at the leading part of each data unit. U(g, h) is user data. E(g, h) is an error detection code (EDC) of the user data. "g" is the number of data units, and "h" is the number of data.

The arrangement in which the direction of the user data U(g, h) is made equal to the direction of the error detection codes E(g, h) is expressed by the following relational expressions between D(i, j) and R(g, h), U(g, h), E(g, h).

$$R(g, h)=D(i, j)=D((h\%206)+1, 20\times g+[h/206])=D(h+1, 20\times g)$$

where h is 0 to 19 and g is 0 to 15

$$U(g, h)=D(i, j)=D(((20+h)\%206)+1, 20\times g+[(20+h)/206])$$

where h is 0 to 4095 and g is 0 to 15

$$E(g, h)=D(i, j)=D(((4116+h)\%206)+1, 20\times g+[(4116+h)/206])$$

where h is 0 to 3 and g is 0 to 15

As for the header information H(g, h), the following relation expression is obtained.

$$H(g, h)=D(i, j)=D(0, (((20\times g+h)/1)\times 237+((20\times g+h)\%1))\%320)= D(0, ((20\times g+h)\times 237\%320))$$

where h is 0 to 19 and g is 0 to 15

Thus, in the ECC block shown in FIG. 25, the number of user data within the ECC block is 64 KB and the number of constituent sectors is 16. The leading data of the frame are dispersed to 320 positions uniformly for each code. The sector ID is n dispersed for each byte.

In the ECC block shown in FIG. 25, the number of sub-sectors is 320 and the leading data of the frame is dispersed at 320 positions uniformly for each code. However, in an ECC block having the number of sub-sectors equal to 160 and having a structure such that
number of sectors=16, number of frames=60, frame length=158 bytes
code length=237, interleave length=320
sector ID=20, k=1
segment length=1, p=20, number of sub-sectors=160, the number of user data within the ECC block is 64 KB and the number of constituent sectors is 16. The leading data of the frame are dispersed to 160 positions at every two codes. Thus, the sector ID is dispersed for every byte.

Although the number of sectors is 16 in the ECC block shown in FIG. 25, the number of sectors can be changed.

For example, in an ECC block having the number of sectors equal to 32 and having a structure such that number of sectors=32, number of frames=30, frame length=79 bytes
    code length=237, interleave length=320
    sector ID=10, k=1
    segment length=1, p=10, number of sub-sectors=320, the number of user data within the ECC block is 64 KB and the number of constituent sectors is 32. The leading data of the frame are dispersed to 320 positions uniformly for each code. Thus, the sector ID is dispersed for every byte.

Alternatively, in an ECC block having the number of sectors equal to 64 and having a structure such that number of sectors=64, number of frames=15, frame length 79 bytes
    code length=237, interleave length=320
    sector ID=5, k=1
    segment length=1, p=5, number of sub-sectors=320, the number of user data within the ECC block is 64 KB and the number of constituent sectors is 64. The leading data of the frame are dispersed to 320 positions uniformly for each code. Thus, the sector ID is dispersed for every byte.

Moreover, in the ECC block shown in FIG. 25, the number of user data within the ECC block is 64 KB. However, in an ECC block having a structure such that number of sectors=16, number of frames=30, frame length=79 bytes
    code length=237, interleave length=160
    sector ID=10, k=1
    segment length=1, p=10, number of sub-sectors=160, the number of user data within the ECC block is 32 KB and the number of constituent sectors is 16. The leading data of the frame are dispersed to 160 positions uniformly for each code. Thus, the sector ID is dispersed for every byte.

Also, by using a disc format such that when the code length is divisible by q (where q=number of subblocks: natural number), {{code length/q}×interleave length}/{segment length×number of sub-sectors} % number of sub-sectors (where % indicates modulo) and the number of sub-sectors are prime numbers, respectively, correction incapability due to concentration of data of a specified position within the frame to a specified code can be avoided.

Figure 30A:
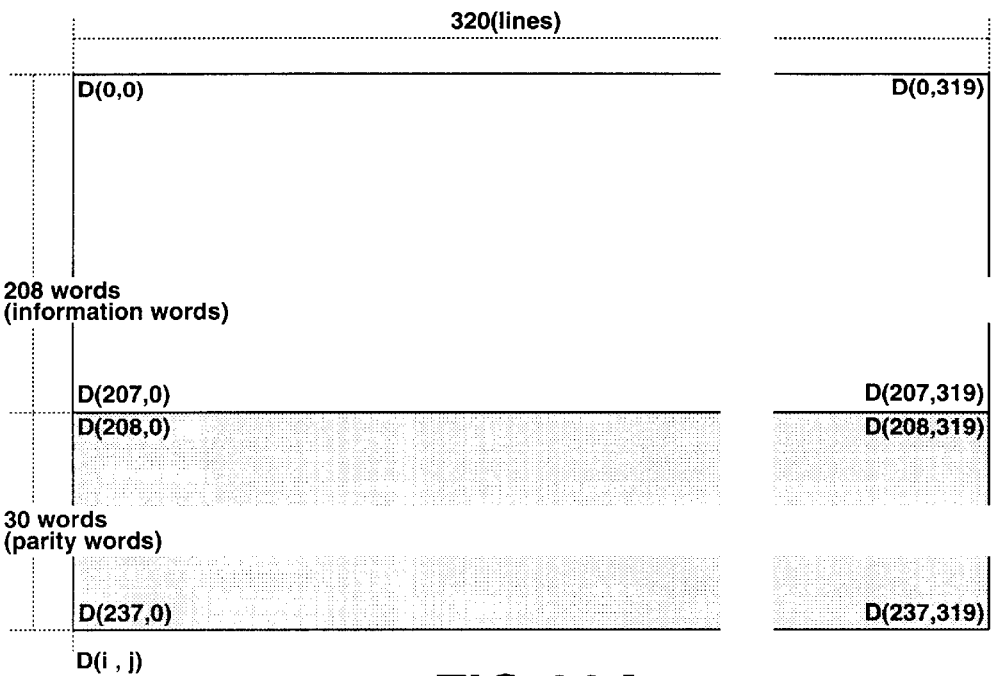
FIGS. 30A and 30B schematically show another structure of the ECC block in the optical disc system according to the present invention.
Figure 30B:
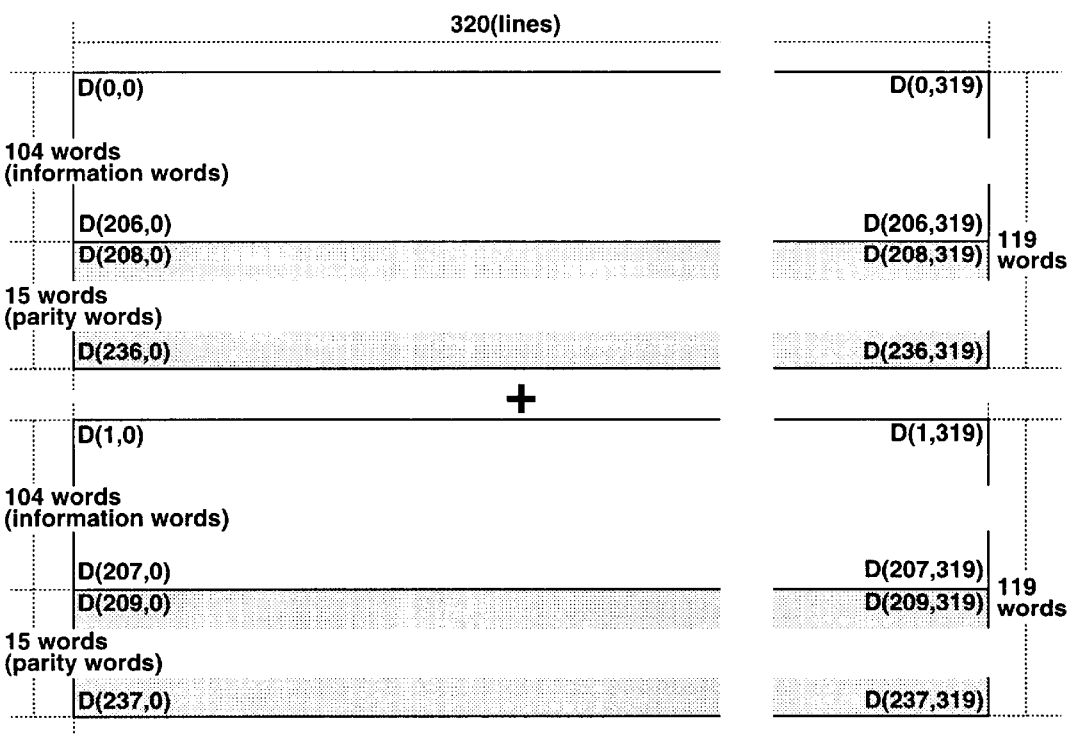
Figure 31A:
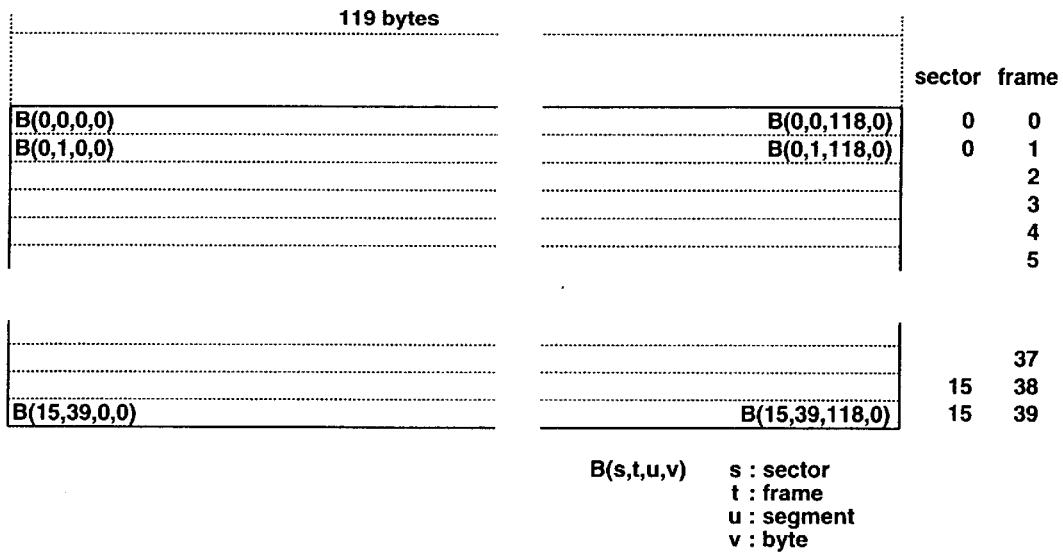
FIGS. 31A and 31B schematically show the frame structure in the ECC block shown in FIG. 30B.

Specifically, for example, an ECC block in which the code length obtained by binding and blocking codes of 208 information words and 30 parity words for 320 lines is 238 (208 information words and 30 parity words) and in which the interleave length is 320, as shown in FIG. 30A, is constituted by two subblocks as shown in FIG. 30B. The frame structure of the data of the ECC block is shown in FIG. 31A. As shown in FIG. 31A, the number of data of one frame is 119 bytes, and is modulated to 1428 channels by (1, 7) modulation as shown in FIG. 31B.

Figure 31B:
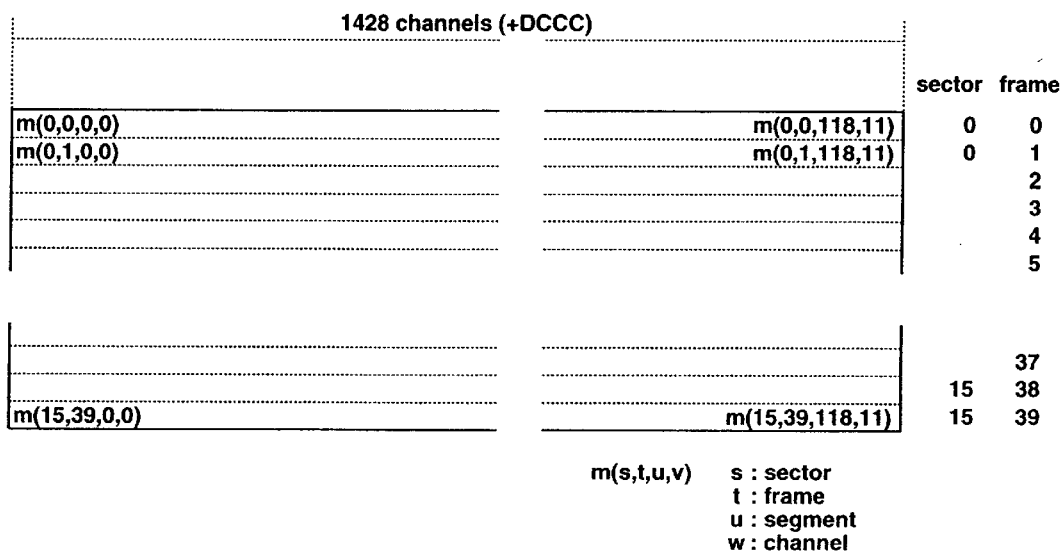

In the frame structure shown in FIGS. 31A and 31B, B(s, t, u, v) is modulated to m(s, t, u, w), where "s" represents the sector, "t" represents the frame, "u" represents the segment, "v" represents the data (bytes), and "w" represents the channel after modulation. In addition, a DCC channel or the like for appending a DCC code to the control of DC components in the (1, 7) modulation system by each DC control cell (DCC) may be provided.

The configuration of recording/reproduction data on the disc is shown in FIG. 32. As shown in FIG. 32, a frame sync part FS is appended to the header of a channel string on the frame (channel) basis. Also, APC and VFO parts are appended to the header of every 40 frames (channels) and a postamble PO is appended to the last part, thus constituting one sector. In this case, APC is a light-emitting pattern area for controlling the recording laser power at the time of recording. VFO is a pattern area for applying PLL for clock extraction at the time of reproduction. As the frame sync part FS, a unique pattern for realizing channel synchronization, which does not appear in the modulation rule, is used. In this embodiment, as the frame sync FS, the frame sync FS0 indicating the header of the sector is discriminated from the other frame sync parts FS 1. However, a sector sync part SS may be inserted between VFO and FS.

In this ECC block, the following structure is employed.

number of sectors=16, number of frames=40, frame length 119 bytes
    code length=238, interleave length=320
    sector ID=20, k=2
    segment length=1, p=20, number of sub-sectors=320
    number of subblocks=2

Thus, in realizing correspondence of the data position on the disc to the data position on the ECC block, the correction code position is updated for each segment, that is, for each byte while the interleave rule is met. By doing so, the one-to-one correspondence between the data on the disc and the data on the ECC block can be realized.

Figure 33:
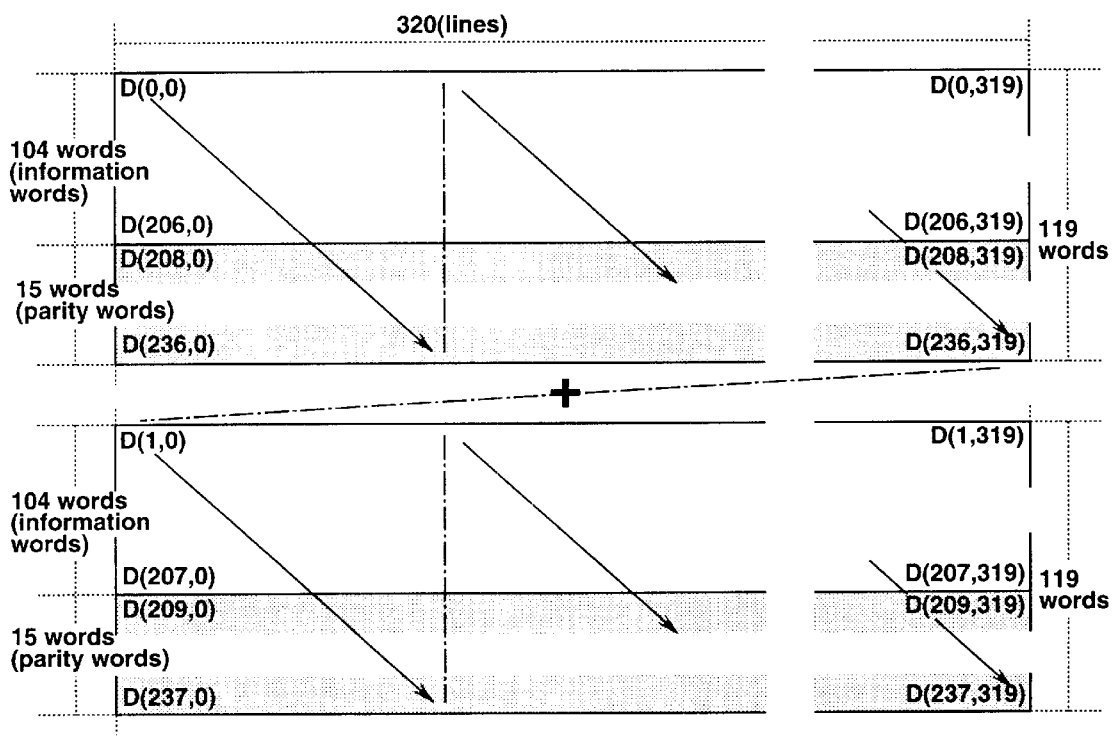
FIG. 33 schematically shows the frame structure within the ECC block shown in FIG. 30B.

The frame structure within the ECC block is shown in FIG. 33.

In the ECC block shown in FIG. 30B, the direction of data on the disc is provided by the rising order of B(s, t, u, v), that is, by the arrangement numbers from the upper position to the lower position in the order of s, t, u and v. The relation between D(i, j) and B(s, t, u, v) is expressed by the following equation.

$$B(s, t, u, v) = D(i,j) = D([((((40{\times}s)+t){\times}119+u){\times}1+v)/1\ ]{\times}2+[s/8]\%238,\ (((((40{\times}s)+t)+t){\times}119+u){\times}1+v)\%320)$$

If the block is not divided into subblocks, {code length×interleave length}/{segment length×sub-sector length} % number of sub-sectors=238 and the number of sub-sectors equal to 320 are not prime numbers with respect to each other. However, if the block is not divided into subblocks, {{code length/q (where q is the number of subblocks: natural number)}×interleave length}/[segment length×number of sub-sectors} % number of sub-sectors=119 and the number of sub-sectors equal to 320 are prime numbers with respect to each other. By continuously arranging the sub-sectors on the disc, the one-to-one correspondence between the data of one block on the disc and the entire data on the ECC block can be realized while the interleave rule is met. In this case, the header, that is, sector ID corresponds to the first two words of information words of all the correction codes, and the user data corresponds to the third and subsequent words of information words of all the correction codes. Therefore, the direction of user data can be made equal to the direction of correction codes without being disturbed by the header.

Figure 34:
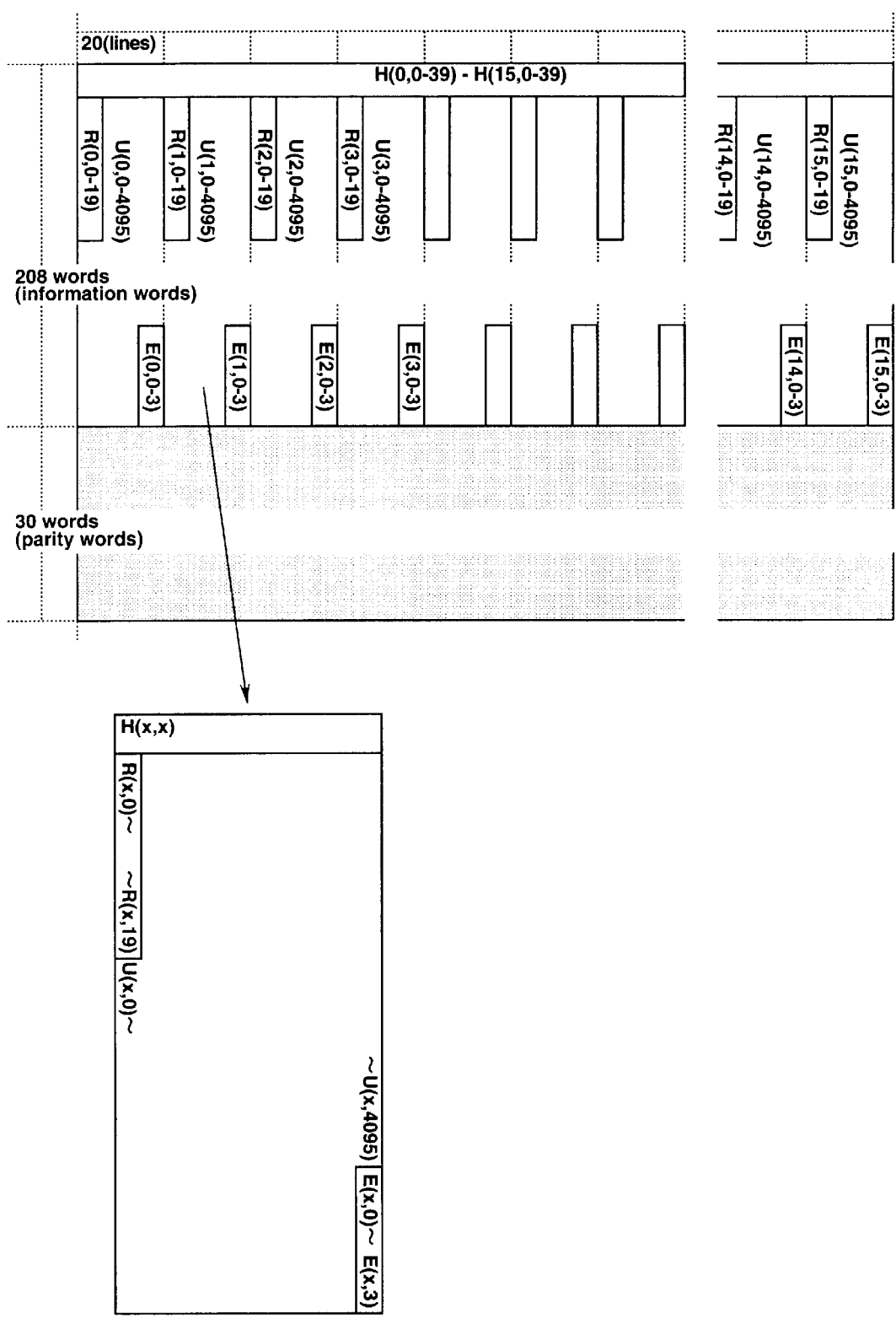
FIG. 34 schematically shows the arrangement and structure of data units within the ECC block shown in FIG. 30B.

The arrangement of data units within the ECC block and the structure of data units are shown in FIG. 34. H(g, h) is header information, that is, sector ID information. R(g, h) is 20-byte information at the leading part of each data unit. U(g, h) is user data. E(g, h) is an error detection code (EDC) of the user data. "g" is the number of data units, and "h" is the number of data.

The arrangement in which the direction of the user data U(g, h) is made equal to the direction of the error detection codes E(g, h) is expressed by the following relational expressions between D(i, j) and R(g, h), U(g, h), E(g, h).

$$R(g, h)=D(i, j)=D((h\%206)+2, 20\times g+[h/206])=D(h+2, 20\times g)$$

where h is 0 to 19 and g is 0 to 15

$$U(g, h)=D(i, j)=D(((20+h)\%206)+2, 20\times g+[(20+h)/206])$$

where h is 0 to 4095 and g is 0 to 15

$$E(g, h)=D(i, j)=D(((4116+h)\%206)+2, 20\times g+[(4116+h)/206])$$

where h is 0 to 3 and g is 0 to 15

As for the header information H(g, h), the following relation expression is obtained.

$$H(g, h)=D(i, j)=D([g/8], (((40\times g+h)/1)\times 119+((40\times g+h)\%1))\%320)=D([g/8], ((40\times g+h)\times 119\%320))$$

where h is 0 to 39 and g is 0 to 15

Thus, in the ECC block shown in FIG. 30B, the number of user data within the ECC block is 64 KB and the number of constituent sectors is 16. The leading data of the frame are dispersed to 320 positions uniformly for each code. The sector ID is dispersed for each byte.

As is clear from the above description, according to the present invention, data recording/reproduction is carried out in a format such that interleave processing is performed on error correction codes so as to collectively block the error correction codes into an error correction unit and that the input/output order of user data in an ECC block as an error correction unit is made coincident with the direction of processing of the error correction codes. Thus, coding can be started at the time when necessary data for generating one code is transmitted, without waiting for transmission of data for one ECC block. Also, transmission of user data can be started at the time when correction of one code is completed, without waiting for completion of correction operation for one ECC block. Therefore, the fixed delay at the time of recording/reproduction can be significantly reduced. Also, a margin can be provided for data processing in reproduction and recording, or the buffer memory can be reduced by reducing the total data processing time. In addition, since the direction of correction codes is the same as the direction of user data, no memory for rearrangement of data is required and the hardware structure can be minimized. Moreover, since less data transmission/reception takes place between the buffer memory and the external device, bus arbitration can be easily carried out.

Thus, the present invention can provide an optical disc recording/reproducing method, an optical disc and an optical disc device for recording/reproducing data in a disc format such that the fixed delay at the time of recording/reproduction can be reduced.

Also, according to the present invention, data recording/reproduction is carried out, for example, in a disc format such that the ECC block is constituted by one or more sectors, the sector is constituted by a plurality of frames, the block length of the ECC block is expressed by the following equation, block length×number of sectors×number of frames×frame length= code length×interleave length the number of sub-sectors is expressed by the following equation, number of sub-sectors=number of sectors×p (where p=number of segments: natural number) and {code length×interleave length}/{segment length× number of sub-sectors} % number of sub-sectors (where % indicates modulo) and the number of sub-sectors are prime numbers, respectively. Thus, correction incapability due to concentration of data of a specified position within a frame to a specified code can be avoided, and higher resistance to errors generated by bit slip can be obtained.

Also, according to the present invention, data recording/ reproduction is carried out, for example, in a disc format such that the ECC block is constituted by one or more sectors, the sector is constituted by a plurality of frames, the block length of the ECC block is expressed by the following equation, block length=number of sectors×number of frames×frame length= code length×interleave length the number of sub-sectors is expressed by the following equation, number of sub-sectors=number of sectors×p (where p=number of segments: natural number) and when the code length is divisible by q (where q=number of subblocks: natural number), {{code length/q}×interleave length}/{segment length×number of sub-sectors} % number of sub-sectors (where % indicates modulo) and the number of sub-sectors are prime numbers, respectively. Thus, correction incapability due to concentration of data of a specified position within a frame to a specified code can be avoided, and higher resistance to errors generated by bit slip can be obtained.

Moreover, according to the present invention, data recording/reproduction is carried out, for example, in a disc format such that the ECC block is constituted by one or more sectors, the sector is constituted by a plurality of frames, the block length of the ECC block is expressed by the following equation, block length×number of sectors×number of frames×frame length= code length×interleave length a sector ID is provided holding the following relations, sector ID length×number of sectors=interleave length×k (where k is a natural number)

sector ID length=segment length×p (where p=number of segments: natural number) and {code length×interleave length}/{segment length× number of sectors} % number of sectors (where % indicates modulo) and the number of sectors are prime numbers, respectively. Thus, correction incapability due to concentration of data of a specified position within a frame to a specified code can be avoided, and higher resistance to errors generated by bit slip can be obtained.

Thus, the present invention can provide an optical disc recording/reproducing method, an optical disc and an optical disc device for recording/reproducing data in a disc format such that correction incapability due to concentration of data of a specified position within a frame to a specified code can be avoided.

What is claimed is:

1. An optical disc having areas wherein error correction codes and user data are to be recorded thereon in a disc format such that the error correction codes interleaved with respect to the direction of data on a disc are collectively blocked into an error correction unit and that the input/output order of the user data in an ECC block as an error correction unit is made coincident with the direction of processing of the error correction codes, whereby the optical disc is usable with a disc reproducing device.

2. The optical disc as claimed in claim 1, having a disc format such that the ECC block is constituted by one or more sectors, the sector is constituted by a plurality of frames, the block length of the ECC block is expressed by the following equation, $$\text{block length} = \text{number of sectors} \times \text{number of frames} \times \text{frame length} = \text{code length} \times \text{interleave length}$$

the number of sub-sectors is expressed by the following equation, $$\text{number of sub-sectors} = \text{number of sectors} \times p$$

(where p=number of segments: natural number) and {code length×interleave length}/{segment length× number of sub-sectors} % number of sub-sectors (where % indicates modulo) and the number of sub-sectors are prime numbers, respectively.

3. The optical disc as claimed in claim 2, having a plurality of disc formats having different ECC block sizes in accordance with the setting of the number of sectors and interleave length.

4. The optical disc as claimed in claim 2, having a disc format such that the number of data within the segment is smaller than the number of data within the frame and that the correction code position is updated for each segment while the interleave rule is met in causing the data position on the disc to correspond to the data position on the ECC block.

5. The optical disc as claimed in claim 4, having a disc format such that the correction code position is updated by one byte.

6. The optical disc as claimed in claim 2, having a disc format such that the ECC block is constituted by one or more sectors, the sector is constituted by a plurality of frames, the block length of the ECC block is expressed by the following equation, $$\text{block length} = \text{number of sectors} \times \text{number of frames} \times \text{frame length} = \text{code length} \times \text{interleave length}$$

and a sector ID is provided holding the following relation $$\text{sector ID length} \times \text{number of sectors} = \text{interleave length} \times k$$

(where k is a natural number).

7. The optical disc as claimed in claim 6, having a disc format such that the number of data within the segment is smaller than the number of data within the frame and that the correction code position is updated for each segment on the basis of sector ID length as a unit while the interleave rule is met in causing the data position on the disc to correspond to the data position on the ECC block.

8. The optical disc as claimed in claim 6, having a plurality of disc formats having different ECC block sizes in accordance with the setting of the number of sectors and interleave length.

9. The optical disc as claimed in claim 6, having a disc format such that the sector ID length is expressed by the following equation $$\text{sector ID length} \times \text{segment length} \times p$$

(where p number of segments: natural number).

10. The optical disc as claimed in claim 9, having a disc format such that {code length×interleave length}/{segment length×number of sectors} % number of sectors (where % indicates modulo) and the number of sectors are prime numbers, respectively.

11. The optical disc as claimed in claim 10, having a disc format such that the number of sectors is $2^n$ and that {code length×interleave length}/{sector ID length ×number of sectors} is an odd number.

12. The optical disc as claimed in claim 1, having a disc format such that the ECC block is constituted by one or more sectors, the sector is constituted by a plurality of frames, the block length of the ECC block is expressed by the following equation, $$\text{block length} = \text{number of sectors} \times \text{number of frames} \times \text{frame length} = \text{code length} \times \text{interleave length}$$

the number of sub-sectors is expressed by the following equation, $$\text{number of sub-sectors} = \text{number of sectors} \times p$$

(where p=number of segments: natural number) and when the code length is divisible by q (where q=number of subblocks: natural number), {{code length/q}×interleave length}/{segment length×number of sub-sectors} % number of sub-sectors (where % indicates modulo) and the number of sub-sectors are prime numbers, respectively.

13. The optical disc as claimed in claim 12, having a plurality of disc formats having different ECC block sizes in accordance with the setting of the number of sectors and interleave length.

14. The optical disc as claimed in claim 12, having a disc format such that the number of data within the segment is smaller than the number of data within the frame and that the correction code position is updated for each segment while the interleave rule is met in causing the data position on the disc to correspond to the data position on the ECC block.

15. The optical disc as claimed in claim 14, having a disc format such that the correction code position is updated by one byte.

* * * * *